US011951526B2

(12) United States Patent
Fujimoto

(10) Patent No.: US 11,951,526 B2
(45) Date of Patent: Apr. 9, 2024

(54) PRESS-FORMED PRODUCT MANUFACTURING METHOD AND FORMING DIE

(71) Applicant: TOPRE CORPORATION, Tokyo (JP)

(72) Inventor: Masaya Fujimoto, Sagamihara (JP)

(73) Assignee: TOPRE CORPORATION, Tokyo (JP)

( * ) Notice: Subject to any disclaimer, the term of this patent is extended or adjusted under 35 U.S.C. 154(b) by 195 days.

(21) Appl. No.: 17/464,768

(22) Filed: Sep. 2, 2021

(65) Prior Publication Data

US 2022/0080491 A1 Mar. 17, 2022

(30) Foreign Application Priority Data

Sep. 16, 2020 (JP) ................................ 2020-155826

(51) Int. Cl.
*B21D 22/02* (2006.01)
*B21D 53/88* (2006.01)
*B30B 15/02* (2006.01)

(52) U.S. Cl.
CPC ............. *B21D 53/88* (2013.01); *B21D 22/02* (2013.01); *B30B 15/02* (2013.01)

(58) Field of Classification Search
CPC ........ B21D 22/02; B21D 22/06; B21D 53/88; B21D 22/26; B30B 15/02
See application file for complete search history.

(56) References Cited

FOREIGN PATENT DOCUMENTS

FR 3076472 A1 * 7/2019 ............. B21D 22/06
JP 2016-221558 A 12/2016

* cited by examiner

*Primary Examiner* — Debra M Sullivan
(74) *Attorney, Agent, or Firm* — METROLEX IP LAW GROUP, PLLC

(57) ABSTRACT

A pressing step of forming a press-formed product includes: a primary formed product forming step of forming a primary formed product having an intermediate wall portion which will be a part of a convex-side wall part, and an intermediate flange continuous with the intermediate wall portion; and a secondary formed product forming step of forming a secondary formed product having a wall part which will be the convex-side wall part by extending at least a portion, on the intermediate wall portion side, of the intermediate flange formed in the primary formed product forming step such that the portion is aligned with the intermediate wall portion. In the primary formed product forming step, the intermediate wall portion is formed such that a boundary valley line between the intermediate wall portion and the intermediate flange is deeper at a large-curvature section than at a small-curvature section.

2 Claims, 17 Drawing Sheets

PRESS-FORMED PRODUCT MANUFACTURING METHOD AND FORMING DIE

CROSS REFERENCE TO RELATED APPLICATIONS

This application is based upon and claims the benefit of priority from prior Japanese Patent Application P2020-155826 filed on Sep. 16, 2020; the entire contents of which are incorporated by reference herein.

BACKGROUND OF THE INVENTION

This disclosure relates to a press-formed product manufacturing method and a forming die.

Forming of press-formed products with various shapes by pressing a blank with a forming die has heretofore been proposed.

For example, forming of a press-formed product having a wall part convexly curved along the longitudinal direction in a plan view by using a forming die has been proposed.

Examples of such a press-formed product having a wall part convexly curved along the longitudinal direction in a plan view include a front pillar outer reinforcement to be used as a part of a skeleton component configured to support a vehicle body.

This front pillar outer reinforcement is a member configured to reinforce a vehicle body, which is required to be thinner and lighter these days. Thus, it is common to use a high tensile strength steel sheet of 980 MPa or higher to manufacture the front pillar outer reinforcement.

Here, when the convexly curved wall part is formed by pressing, compressive stress is generated at the convexly curved wall part due to shrink flanging. This leads to a problem that the convexly curved wall part is prone to wrinkling, which makes it difficult to achieve a target product quality. Such a problem is prominent particularly when a high tensile strength steel sheet of 980 MPa or higher is used to form a front pillar outer reinforcement required to be thinner and lighter.

Thus, forming of a press-formed product having a wall part convexly curved along the longitudinal direction in a plan view by the method disclosed in Japanese Patent Application Publication No. 2016-221558 has been proposed.

The press forming method disclosed in Japanese Patent Application Publication No. 2016-221558 includes: a first step of performing form molding by relatively moving a die toward a punch in a state where a die shoulder part is in contact with a part of a blank corresponding to a wall part; a second step of clamping a part of the blank on an end side relative to the part corresponding to the wall part between the die and the punch; and a third step of forming the wall part by relatively moving the die toward the punch to the forming bottom dead center with the portion on the end side clamped.

In Japanese Patent Application Publication No. 2016-221558, the above method is employed so that a wall part convexly curved along the longitudinal direction in a plan view can be formed in a single step and wrinkling of the wall part can be prevented.

SUMMARY OF THE INVENTION

Here, in the above conventional technique, the wall part convexly curved along the longitudinal direction in a plan view is formed in a single step. Thus, in the case where the wall part convexly curved along the longitudinal direction in a plan view has a large length, in the case where the curved section has a large curvature, or in other similar cases, the effect of the compressive stress by the shrink flanging is so great that the convexly curved wall part may wrinkle.

As described above, the above conventional technique has a problem that wrinkling cannot be prevented sufficiently.

It is therefore an object of this disclosure to obtain a press-formed product manufacturing method and forming die capable of more reliably preventing wrinkling.

A press-formed product manufacturing method according to this disclosure includes a pressing step of forming a press-formed product by pressing, the press-formed product having an apex part curved along a longitudinal direction in a plan view and a convex-side wall part provided to be continuous with a convexly curved side of the apex part. Also, the pressing step includes a primary formed product forming step of forming a primary formed product having an intermediate wall portion which will be a part of the convex-side wall part, and an intermediate flange provided to be continuous with the intermediate wall portion, and a secondary formed product forming step of forming a secondary formed product having a wall part which will be the convex-side wall part by extending at least a portion, on the intermediate wall portion side, of the intermediate flange formed in the primary formed product forming step such that at least the portion of the intermediate flange on the intermediate wall portion side is aligned with the intermediate wall portion. Moreover, in the primary formed product forming step, the intermediate wall portion is formed such that a depth of a boundary valley line between the intermediate wall portion and the intermediate flange at a large-curvature section is larger than a depth of the boundary valley line at a small-curvature section.

Also, a forming die according to this disclosure is a forming die capable of being used in forming of a press-formed product by pressing, the press-formed product having an apex part curved along a longitudinal direction in a plan view, a convex-side sidewall portion provided to be continuous with a convexly curved side of the apex part, and a flange provided to be continuous with the convex-side sidewall portion. This forming die has a sidewall portion formation surface concavely curved along the longitudinal direction in the plan view and configured to form the convex-side sidewall portion; and a flange formation surface provided to be continuous with the sidewall portion formation surface and configured to form the flange. Moreover, a height of a boundary ridge line between the sidewall portion formation surface and the flange formation surface at a large-curvature section is larger than a height of the boundary ridge line at a small-curvature section.

According to this disclosure, it is possible to obtain a press-formed product manufacturing method and forming die capable of more reliably preventing wrinkling.

DESCRIPTION OF THE EMBODIMENTS

An embodiment of this disclosure will be described below in detail with reference to the drawings. Note that in the following, a front pillar outer reinforcement to be used as a part of a skeleton component configured to support a vehicle body will be exemplarily described as a press-formed product. Also, a method of forming the press-formed product by cold pressing with dies using a transfer press will be exemplarily described.

Moreover, the following description will be given on the assumption that the vertical direction of the press-formed product, a primary formed product, and a secondary formed product is based on a state where their apex parts are positioned at the top. Furthermore, the description will be given on the assumption that the vertical direction of the dies is based on a state where a punch is positioned at the bottom and a pad and a bend die are positioned at the top.

[Example of Entire Configuration of Front Pillar Outer Reinforcement]

First of all, an example of the entire configuration of the front pillar outer reinforcement (press-formed product) 20 according to the present embodiment will be described using FIGS. 1 and 2.

Figure 1:
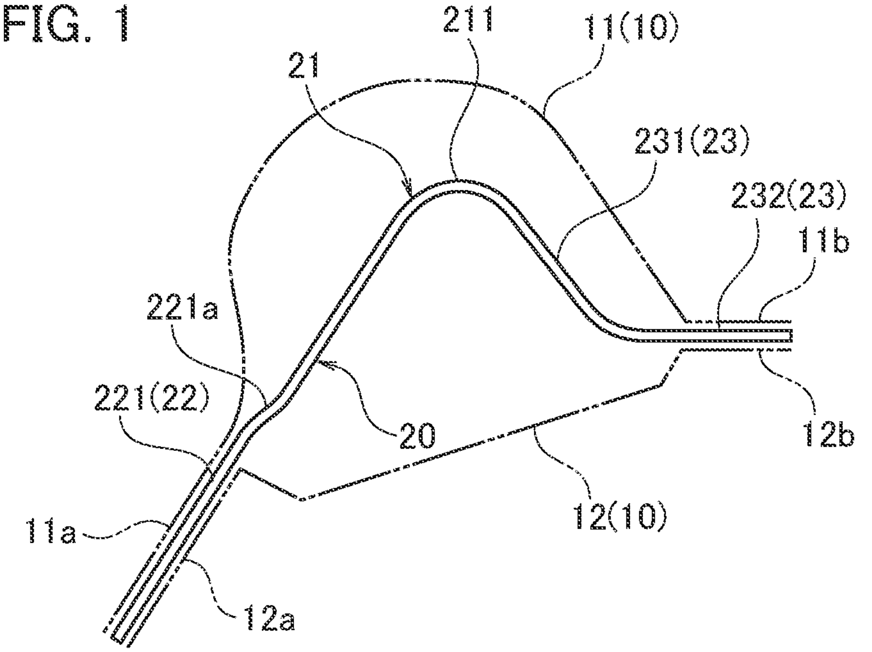
FIG. 1 is a cross-sectional view schematically showing a press-formed product according to one embodiment which is used as a member of a skeleton component configured to support a vehicle body.

As shown in FIG. 1, the front pillar outer reinforcement 20 according to the present embodiment is a reinforcing component formed inside a front pillar 10 of a vehicle and is made of a high tensile strength steel sheet or the like, for example.

The shape of the front pillar outer reinforcement is determined by the shape and strength design of the vehicle. For example, there are front pillar outer reinforcements with curved shapes along the longitudinal direction in a plan view. Examples of the curved shapes along the longitudinal direction in a plan view include a shape in which the entire longitudinal region is curved with a longitudinal center section as an apex, a shape in which only a longitudinal center section is curved and both longitudinal sides are straight, a shape in which the region from the longitudinal center to one longitudinal end is curved and the other longitudinal side is straight, and so on.

In the present embodiment, a front pillar outer reinforcement 20 in which only the longitudinal center section is curved and both longitudinal sides are substantially straight is exemplarily described. Specifically, as shown in FIG. 2, the front pillar outer reinforcement 20 has a curved section **20*a* formed at a longitudinal center section. This curved section 20*a* is formed such that its curvature becomes gradually smaller from a center portion toward both end portions. Moreover, straight sections 20*b* are formed which extend substantially straight respectively from both end portions of the curved section 20*a***, at which the curvature is small.

The front pillar outer reinforcement 20 also includes an apex part 21 curved along the longitudinal direction in a plan view, and this apex part 21 includes an arc portion 211 being convex upward. Specifically, the apex part 21 is in a substantially arc shape in a cross-sectional view taken along a plane crossing the longitudinal direction.

Moreover, a convex-side wall part 22 is provided to be continuous with the lower end of the apex part 21 on one side (the convexly curved side in the plan view) and a concave-side wall part 23 is provided to be continuous with the lower end of the apex part 21 on the other side (the concavely curved side in the plan view).

In the present embodiment, as shown in FIG. 1, the convex-side wall part 22 includes a convex-side slanted wall portion 221 extending downward and outward (toward an outer side in the width direction). This convex-side slanted wall portion 221 is formed so as to be curved along a convexly curved wall portion of the apex part 21. Thus, in the present embodiment, on the convexly curved side of the apex part 21, a slanted wall portion with no flange at its edge is formed. Note that in the present embodiment, the height (length) of the convex-side slanted wall portion 221 from the apex part 21 side to the edge side (free end side) is larger than that of the concave-side wall part 23. For this reason, a step portion 221*a* is formed at a substantially center portion of the convex-side slanted wall portion 221 in the vertical direction at a section corresponding to the curved section 20*a*. This makes it possible to prevent deformation of the convex-side slanted wall portion 221.

The concave-side wall part 23 includes a concave-side slanted wall portion 231 extending downward and outward (toward an outer side in the width direction) and a concave-side flange 232 provided to be continuous with the lower end of the concave-side slanted wall portion 231. Note that the concave-side slanted wall portion 231 is formed so as to be curved along a concavely curved wall portion of the apex part 21.

The front pillar outer reinforcement 20 with such a shape is formed inside the front pillar 10 of the vehicle to reinforce the front pillar 10.

For example, as shown in FIG. 1, the front pillar 10 can be reinforced by forming the front pillar 10 with a pair of front pillar panels 11 and 12 and disposing the front pillar outer reinforcement 20 to be sandwiched between the pair of front pillar panels 11 and 12.

This FIG. 1 exemplarily shows the front pillar 10 with the front pillar outer reinforcement 20 formed therein such that a lower end portion of the convex-side slanted wall portion 221 is sandwiched between flanges 11*a* and 12*a* of the front pillar panels 11 and 12 on one side and an edge portion of the concave-side flange 232 is sandwiched between flanges 11*b* and 12*b* of the front pillar panels 11 and 12 on the other side.

In the present embodiment, the front pillar outer reinforcement 20 with such a shape is manufactured by pressing a blank 30 with dies. That is, a method of manufacturing the front pillar outer reinforcement (press-formed product) 20 according to the present embodiment includes a pressing step of forming a press-formed product by pressing with dies.

Meanwhile, the front pillar outer reinforcement 20 according to the present embodiment is a reinforcing member of a vehicle, as mentioned earlier. As methods of manufacturing such an automobile component by pressing, there are cold pressing, which is a common type of pressing, a hot pressing, which uses hot working on a steel sheet to temper its material, and the like. Here, manufacturing by hot pressing requires use of a special working apparatus. Thus, manufacturing by cold pressing, which can achieve manufacturing without use of a special working apparatus, is preferable in cost wise.

In the case of manufacturing a product having a convexly curved slanted wall portion by cold pressing, the product can be manufactured by draw forming or bending (form molding).

Note that in the case of using draw forming, it is necessary to pull the blank by clamping a portion of the blank excluding the portion to be the product with a clamp or the like so that the product can be prevented from wrinkling.

In recent years, however, members such as front pillar outer reinforcements have been required to be thinner and lighter, and it has been common to use high tensile strength steel sheets of 980 MPa or higher as the materials of recent front pillar outer reinforcements.

Thus, in the case of using a high tensile strength steel sheet having a smaller sheet thickness for achieving a lighter weight, performing the above-mentioned draw forming may result in cracking due to the reduction in the sheet thickness of the member by the pulling.

For this reason, in the case of manufacturing a product having a convexly curved slanted wall portion by cold pressing, it is preferable to manufacture the product by bending (form molding).

However, when the product having a convexly curved slanted wall portion is formed by bending (form molding), compressive stress is generated at the convexly curved slanted wall portion due to shrink flanging. This compressive stress makes the convexly curved slanted wall portion prone to wrinkling, which sometimes makes it difficult to achieve a target product quality and also causes additional man-hours for die maintenance and the like.

In particular, in the present embodiment, the convex-side slanted wall portion 221 of the front pillar outer reinforcement 20 has a relatively long length, as mentioned above.

Accordingly, when the convex-side slanted wall portion 221 is formed by bending (form molding), the effect of the compressive stress due to the shrink flanging is relatively large. This makes the convexly curved wall part more prone to wrinkling.

The present embodiment therefore employs a measure to be able to more reliably prevent the wrinkling when the press-formed product is manufactured.

Specifically, the pressing step includes a primary formed product forming step of forming a primary formed product 40, and a secondary formed product forming step of forming a secondary formed product 50 by pressing the primary formed product 40 formed in the primary formed product forming step.

Here, in the primary formed product forming step, the convex-side wall part 22 (convex-side slanted wall portion 221) is formed only partway.

Then, the secondary formed product forming step, the convex-side wall part 22 (convex-side slanted wall portion 221) is formed from the one formed partway in the primary formed product forming step.

As described above, in the present embodiment, the convex-side wall part 22 (convex-side slanted wall portion 221) is formed through two stages.

In the following, the steps included in the method of manufacturing the front pillar outer reinforcement (press-formed product) 20 will be described individually.

Note that in the present embodiment, a method including a blank working step, the primary formed product forming step, the secondary formed product forming step, a restrike bending step, and a trimming-piercing step will be exemplarily described as the method of manufacturing the front pillar outer reinforcement (press-formed product) 20.

Figure 2:
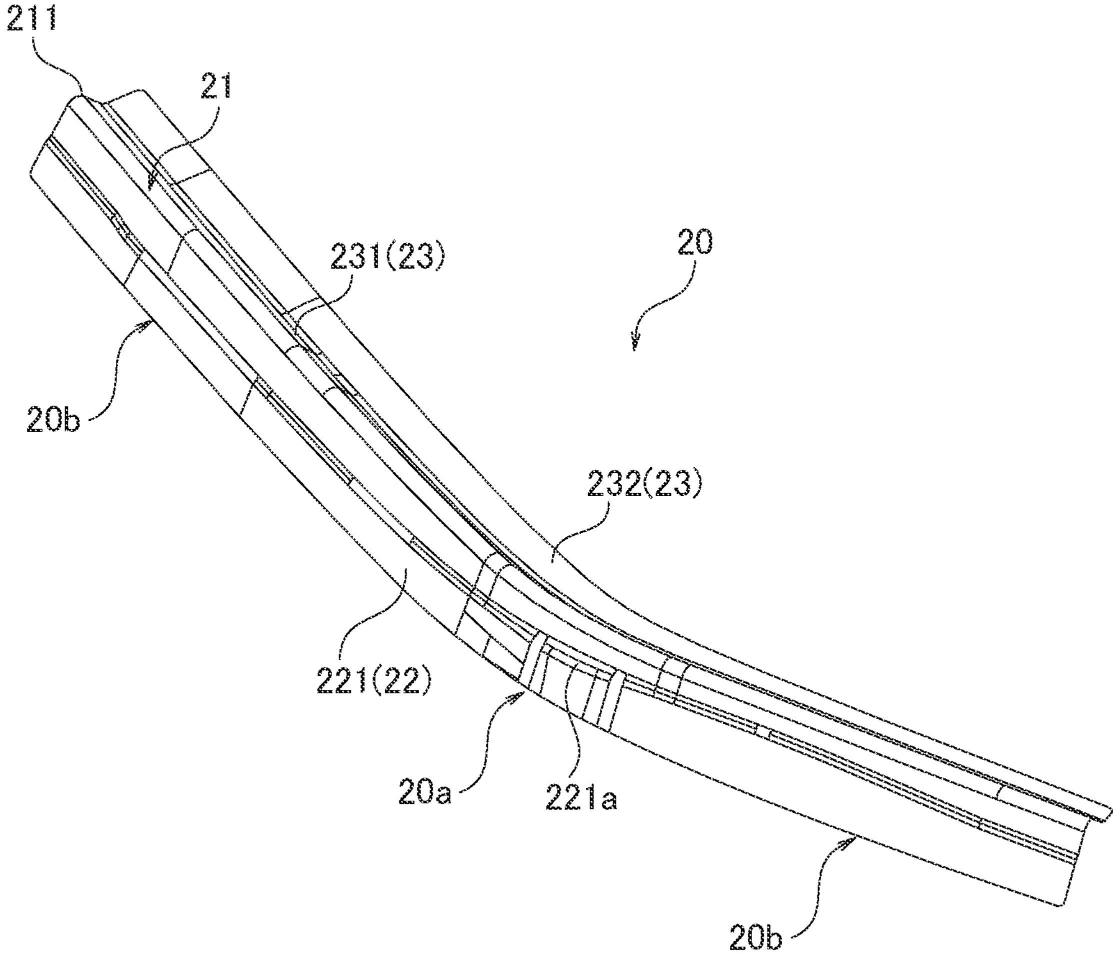
FIG. 2 is a perspective view schematically showing the press-formed product according to the one embodiment.

Meanwhile, FIGS. 1 and 2 disclose views in which portions formed by the trimming-piercing step are omitted. Thus, the shape of the front pillar outer reinforcement 20 shown in FIGS. 1 and 2 differs from the shape of the actual product in detail.

[Blank Working Step]

Figure 3:
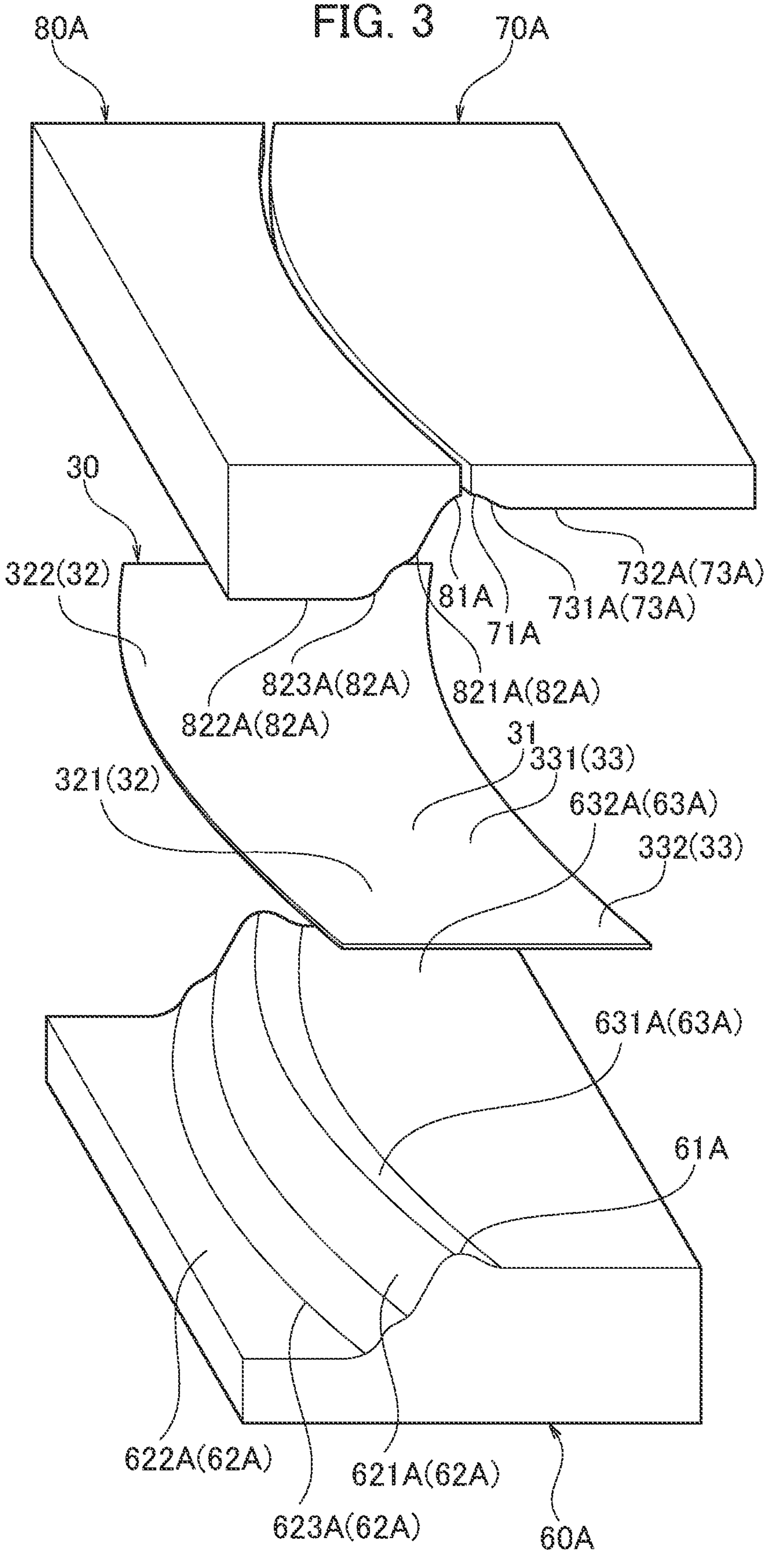
FIG. 3 is a perspective view schematically showing dies and a blank to be used in press forming for obtaining a primary formed product according to the one embodiment.

Firstly, in the blank working step, in order to form the front pillar outer reinforcement 20 elongated in the longitudinal direction, the blank 30 of a flat sheet shape as shown in FIG. 3 is formed by, for example, blanking or the like. An SPFC steel sheet (cold-reduced high strength steel sheet with improved formability for automobile structural uses) can be used as the material of this blank 30, for example. Here, it is preferable to use an SPFC steel sheet with a tensile strength of 270 MPa or more and a thickness of 0.6 mm to 2.3 mm or so. In the present embodiment, an SPFC steel sheet with a tensile strength of approximately 980 MPa and a thickness of approximately 1.2 mm is used.

The blank 30 is shaped like the longitudinally elongated front pillar outer reinforcement 20 or primary formed product 40 in an expanded state, and has a profile having a predetermined width and arcuately curved along the longitudinal direction. Note that the profile of the blank is determined in advance according to the shape of the finished product.

In the present embodiment, this blank 30 is press-formed with the dies shown in FIG. 3 (primary formed product forming punch 60A, primary formed product forming pad 70A, and primary formed product forming bend die 80A) to form the primary formed product 40.

Here, in the present embodiment, a substantially center portion of the blank 30 in the width direction is a part 31 where an apex part of the primary formed product is planned to be formed (hereinafter referred to as the planned primary formed product apex part formation part). Moreover, the convex side of the planned primary formed product apex part formation part 31 is a part 32 where a convex-side wall part of the primary formed product is planned to be formed (hereinafter referred to as the planned primary formed product convex-side wall part formation part 32), while the concave side is a part 33 where a concave-side wall part of the primary formed product is planned to be formed (hereinafter referred to as the planned primary formed product concave-side wall part formation part 33). Furthermore, the planned primary formed product apex part formation part 31 side of the planned primary formed product convex-side wall part formation part 32 is a portion 321 where a convex-side slanted wall portion of the primary formed product is planned to be formed (hereinafter referred to as the planned primary formed product convex-side slanted wall portion formation portion 321), while the edge side is a portion 322 where a convex-side intermediate flange of the primary formed product is planned to be formed (hereinafter referred to as the planned primary formed product convex-side intermediate flange formation portion 322). In addition, the planned primary formed product apex part formation part 31 side of the planned primary formed product concave-side wall part formation part 33 is a portion 331 where a concave-side slanted wall portion of the primary formed product is planned to be formed (hereinafter referred to as the planned primary formed product concave-side slanted wall portion formation portion 331), while the edge side is a portion 332 where a concave-side intermediate flange of the primary formed product is planned to be formed (hereinafter referred to as the planned primary formed product concave-side intermediate flange formation portion 332).

[Primary Formed Product Forming Step]

Next, in the primary formed product forming step, the blank 30 formed in the blank working step is form-molded (pressed) to form the primary formed product 40 having a primary formed product convex-side slanted wall portion (intermediate wall portion: convex-side sidewall portion) 421 which will be a part of the convex-side wall part 22, and a primary formed product convex-side intermediate flange (flange) 422 which is provided to be continuous with this slanted wall portion 421.

Figure 9:
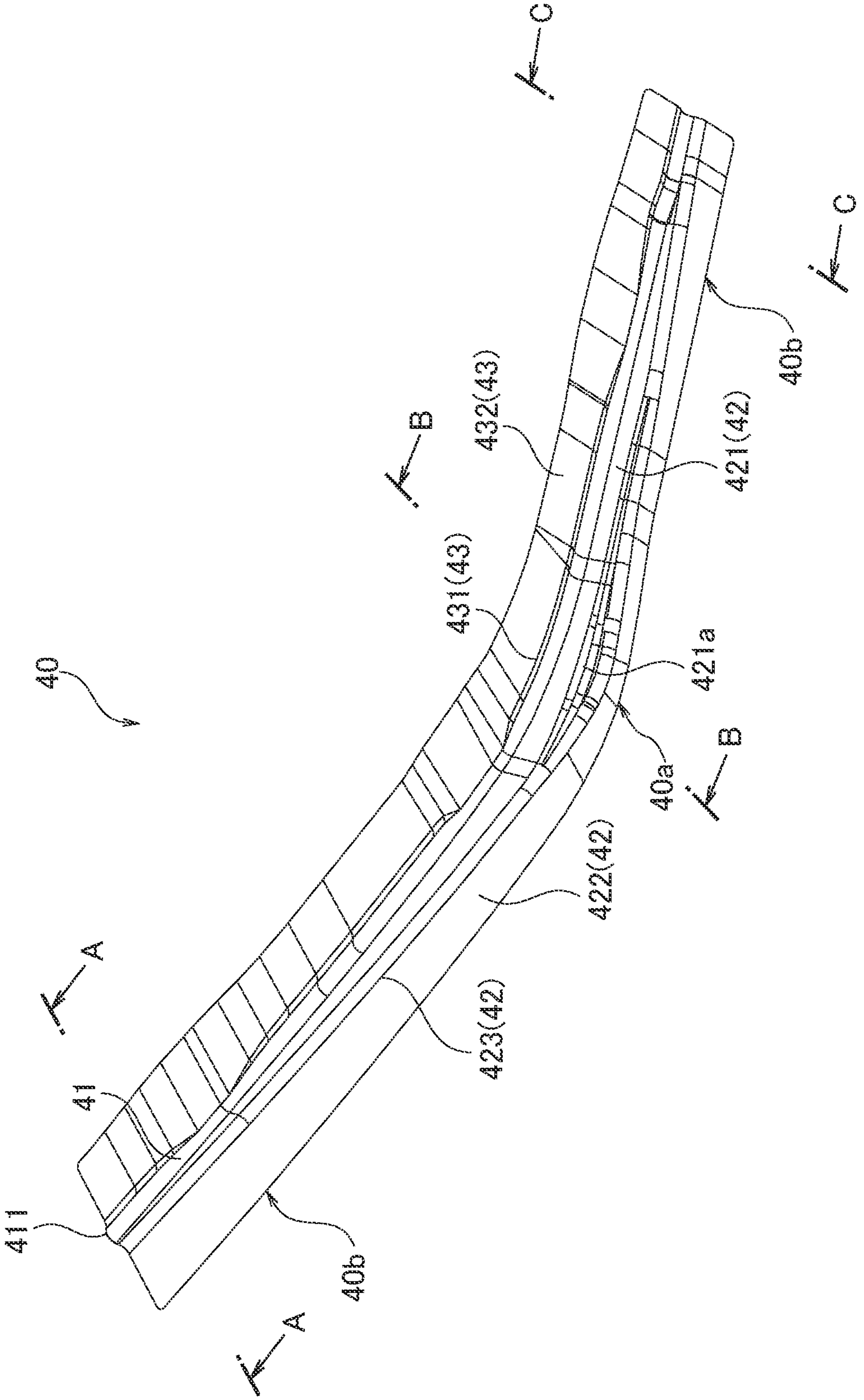
FIG. 9 is a perspective view schematically showing the primary formed product according to the one embodiment.

Here, as shown in FIG. 9, a curved section 40*a* is formed at a longitudinal center section of the primary formed product 40. This curved section 40*a* is formed such that its curvature becomes gradually smaller from a center portion toward both end portions. Then, straight sections 40*b* are formed which extend substantially straight respectively from both end portions of the curved section 40*a*, at which the curvature is small. Thus, the primary formed product 40 formed in the primary formed product forming step is curved to have an apex at a large-curvature portion of the curved section 40*a* at the longitudinal center section, and the curvature becomes smaller toward both longitudinally outer sides (both longitudinal sides are substantially straight).

Figure 8:
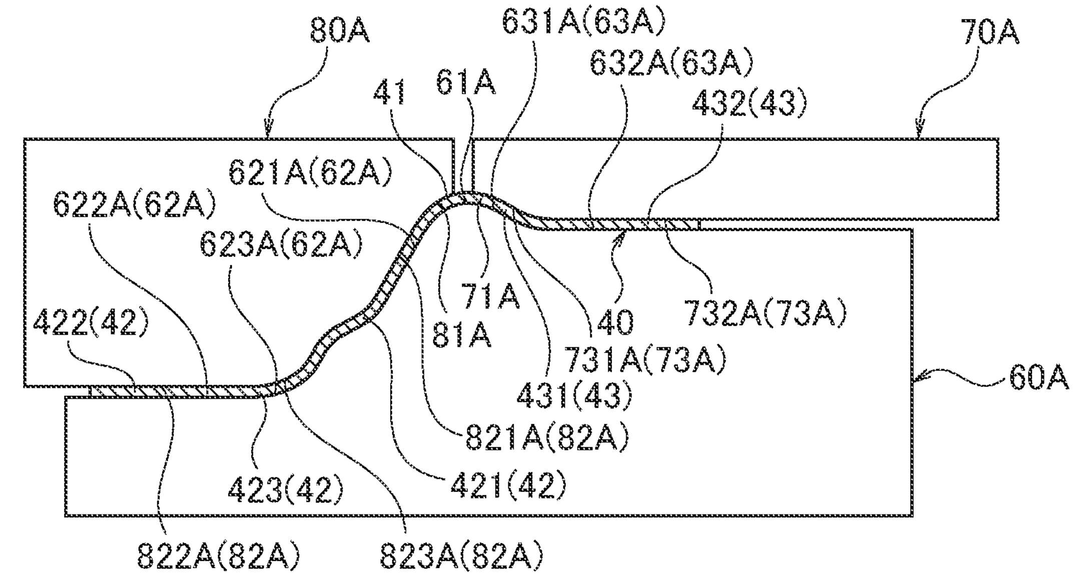
FIG. 8 is a cross-sectional view schematically showing the blank clamped between the punch and the pad, press-formed with the die in the press forming for obtaining the primary formed product according to the one embodiment.
Figure 10:
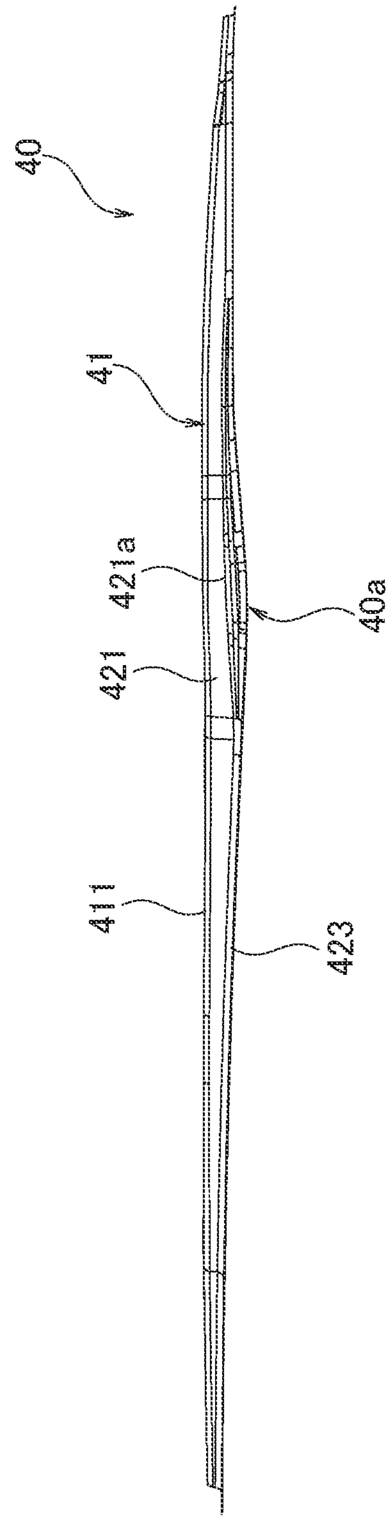
FIG. 10 is a view schematically showing the side surface of a convexly curved side of the primary formed product according to the one embodiment.

Also, as shown in FIGS. 8 to 10, the primary formed product 40 includes a primary formed product apex part 41 curved along the longitudinal direction in a plan view, and this primary formed product apex part 41 includes an arc portion 411 being convex upward. Specifically, the primary formed product apex part 41 is in a substantially arc shape in a cross-sectional view taken along a plane crossing the longitudinal direction.

Moreover, a primary formed product convex-side wall part 42 is provided to be continuous with the lower end of the primary formed product apex part 41 on one side (the convexly curved side in the plan view) and a primary formed product concave-side wall part 43 is provided to be continuous with the lower end of the primary formed product apex part 41 on the other side (the concavely curved side in the plan view).

In the present embodiment, the primary formed product convex-side wall part 42 includes a primary formed product convex-side slanted wall portion (intermediate wall portion: convex-side sidewall portion) 421 extending downward and outward (toward an outer side in the width direction) and a primary formed product convex-side intermediate flange (flange) 422 provided to be continuous with the lower end of the primary formed product convex-side slanted wall portion 421. Note that the primary formed product convex-side slanted wall portion 421 is formed along a convexly curved wall portion of the primary formed product apex part 41 so as to be convexly curved along the longitudinal direction. Moreover, a step portion 421*a* is formed at a lower end portion of the primary formed product convex-side slanted wall portion 421 in the vertical direction at a section corresponding to the curved section 40*a*. Furthermore, at a boundary portion between the primary formed product convex-side slanted wall portion 421 and the primary formed product convex-side intermediate flange 422, a boundary valley line 423 is formed so as to extend in the longitudinal direction.

The primary formed product concave-side wall part 43 includes a primary formed product concave-side slanted wall portion 431 extending downward and outward (toward an outer side in the width direction) and a primary formed product concave-side flange 432 provided to be continuous with the lower end of the primary formed product concave-side slanted wall portion 431. Note that the primary formed product concave-side slanted wall portion 431 is formed along a concavely curved wall portion of the primary formed product apex part 41 so as to be concavely curved along the longitudinal direction.

In the present embodiment, as shown in FIG. 3, the blank 30 is set between a lower die (primary formed product forming punch 60A) which is disposed at the bottom and a leading pad (primary formed product forming pad 70A) and die (primary formed product forming bend die 80A) which are disposed at the top, and the blank 30 is pressed with these three dies to form the primary formed product 40.

Figure 4:
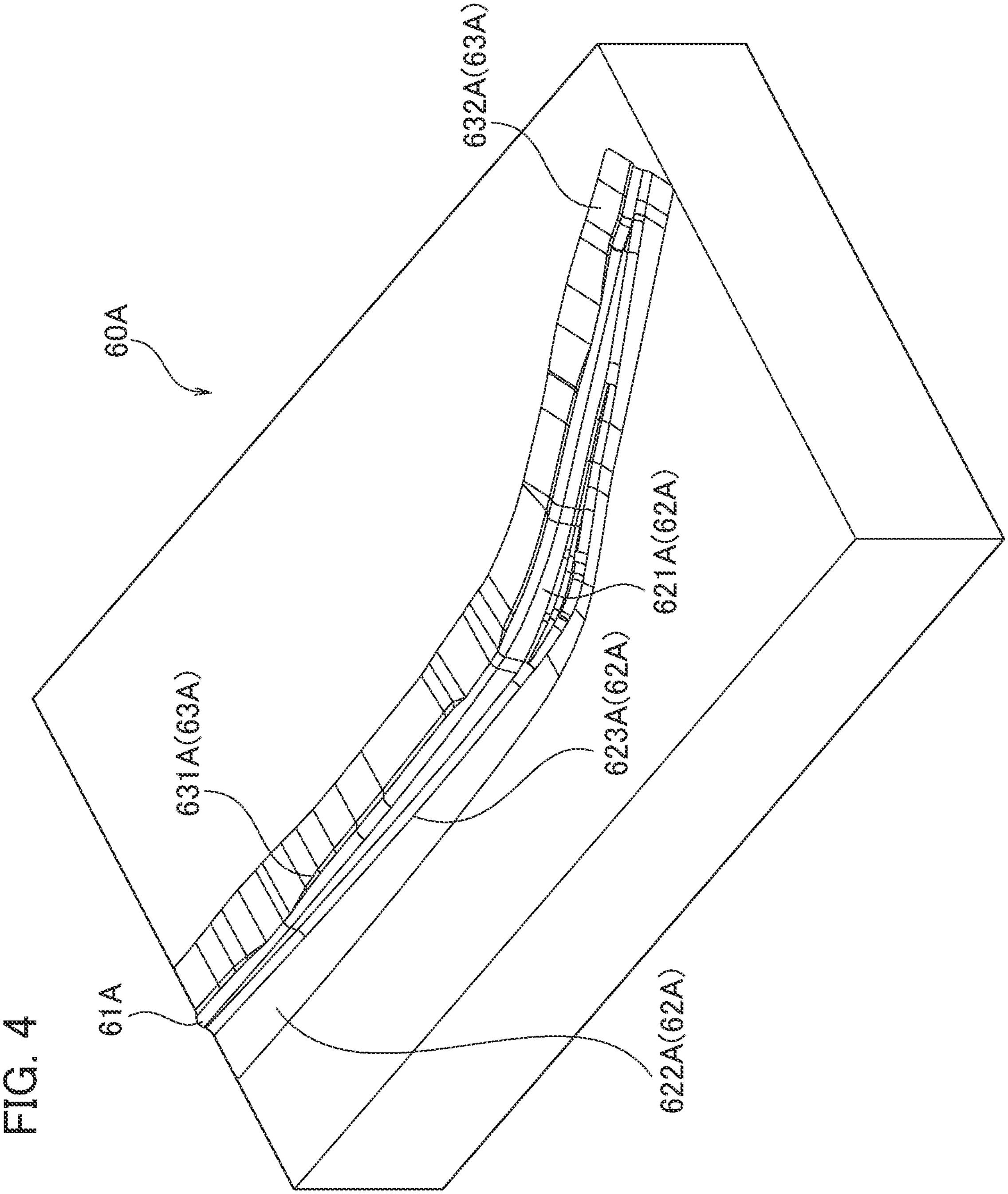
FIG. 4 is a view schematically showing a punch to be used in the press forming for obtaining the primary formed product according to the one embodiment, and is a perspective view of the punch as seen from the side of its surface that contacts the primary formed product.

Here, a part of the upper surface of the lower die (primary formed product forming punch 60A) has a shape corresponding to the shape of the primary formed product 40. Specifically, as shown in FIG. 4, the upper surface of the lower die (primary formed product forming punch 60A) includes a primary formed product apex part formation surface 61A, a primary formed product convex-side wall part formation surface 62A, and a primary formed product concave-side wall part formation surface 63A.

Further, the primary formed product convex-side wall part formation surface 62A includes a primary formed product convex-side slanted wall portion formation surface 621A convexly curved along the longitudinal direction in a plan view, and a primary formed product convex-side intermediate flange formation surface 622A provided to be continuous with the surface 621A. Furthermore, a boundary valley line 623A configured to form a boundary valley line of the primary formed product is formed at a boundary portion between the primary formed product convex-side slanted wall portion formation surface 621A and the primary formed product convex-side intermediate flange formation surface 622A.

The primary formed product concave-side wall part formation surface 63A includes a primary formed product concave-side slanted wall portion formation surface 631A concavely curved along the longitudinal direction in the plan view, and a primary formed product concave-side intermediate flange formation surface 632A provided to be continuous with the surface 631A.

Figure 5:
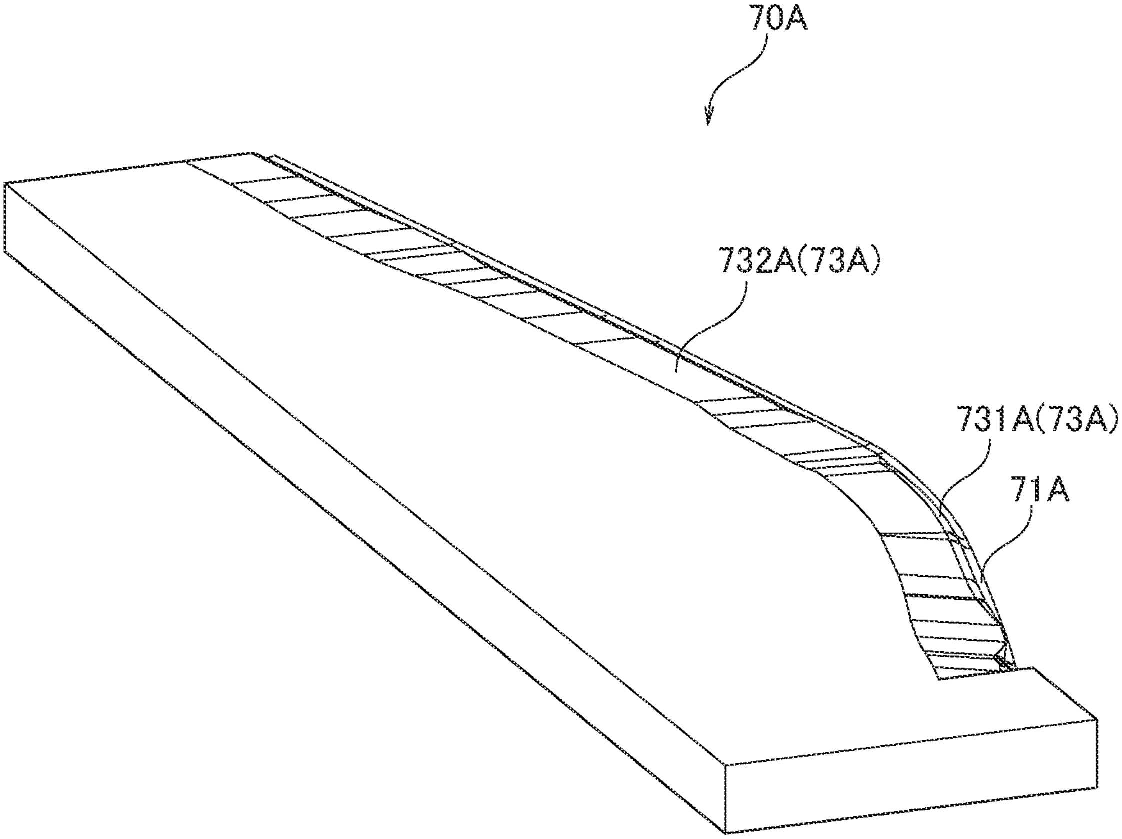
FIG. 5 is a view schematically showing a pad to be used in the press forming for obtaining the primary formed product according to the one embodiment, and is a perspective view of the pad as seen from the side of its surface that contacts the primary formed product.

Also, a part of the lower surface of the leading pad (primary formed product forming pad 70A) has a shape corresponding to the shape of the concave side of the primary formed product apex part 41 and the primary formed product concave-side wall part 43. Specifically, as shown in FIG. 5, the lower surface of the leading pad (primary formed product forming pad 70A) includes a primary formed product apex part concave side formation surface 71A and a primary formed product concave-side wall part formation surface 73A. Moreover, the primary formed product concave-side wall part formation surface 73A includes a primary formed product concave-side slanted wall portion formation surface 731A convexly curved along the longitudinal direction in a plan view, and a primary formed product concave-side intermediate flange formation surface 732A provided to be continuous with the surface 731A.

Figure 6:
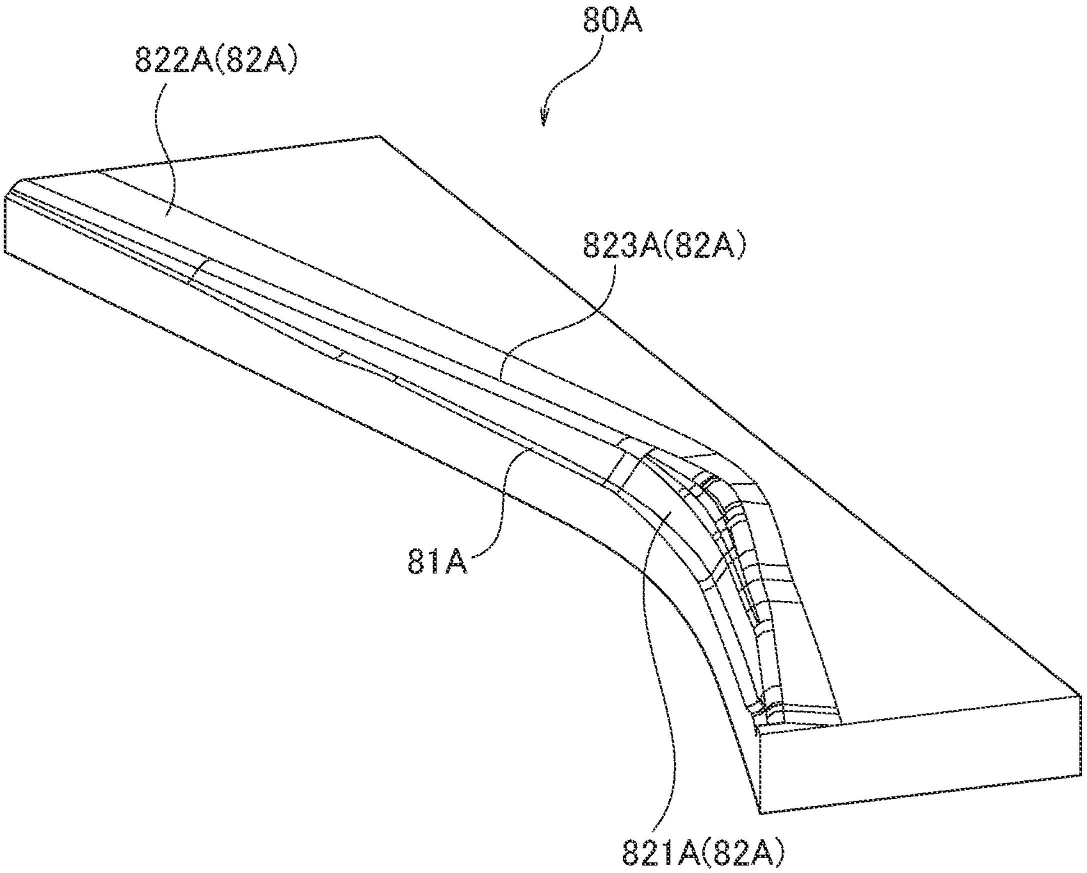
FIG. 6 is a view schematically showing a die to be used in the press forming for obtaining the primary formed product according to the one embodiment, and is a perspective view of the die as seen from the side of its surface that contacts the primary formed product.

Also, a part of the lower surface of the die (primary formed product forming bend die 80A) has a shape corresponding to the shape of the convex side of the primary formed product apex part 41 and the primary formed product convex-side wall part 42. Specifically, as shown in FIG. 6, the lower surface of the die (primary formed product forming bend die 80A) includes a primary formed product apex part convex side formation surface 81A and a primary formed product convex-side wall part formation surface 82A.

Further, the primary formed product convex-side wall part formation surface 82A includes a primary formed product convex-side slanted wall portion formation surface (intermediate wall portion formation surface: sidewall portion formation surface) 821A concavely curved along the longitudinal direction in a plan view, and a primary formed product convex-side intermediate flange formation surface (intermediate flange formation surface: flange formation surface) 822A provided to be continuous with the surface 821A. Furthermore, a boundary ridge line 823A configured to form the boundary valley line of the primary formed product is formed at a boundary portion between the primary formed product convex-side slanted wall portion formation surface 821A and the primary formed product convex-side intermediate flange formation surface 822A.

Figure 7:
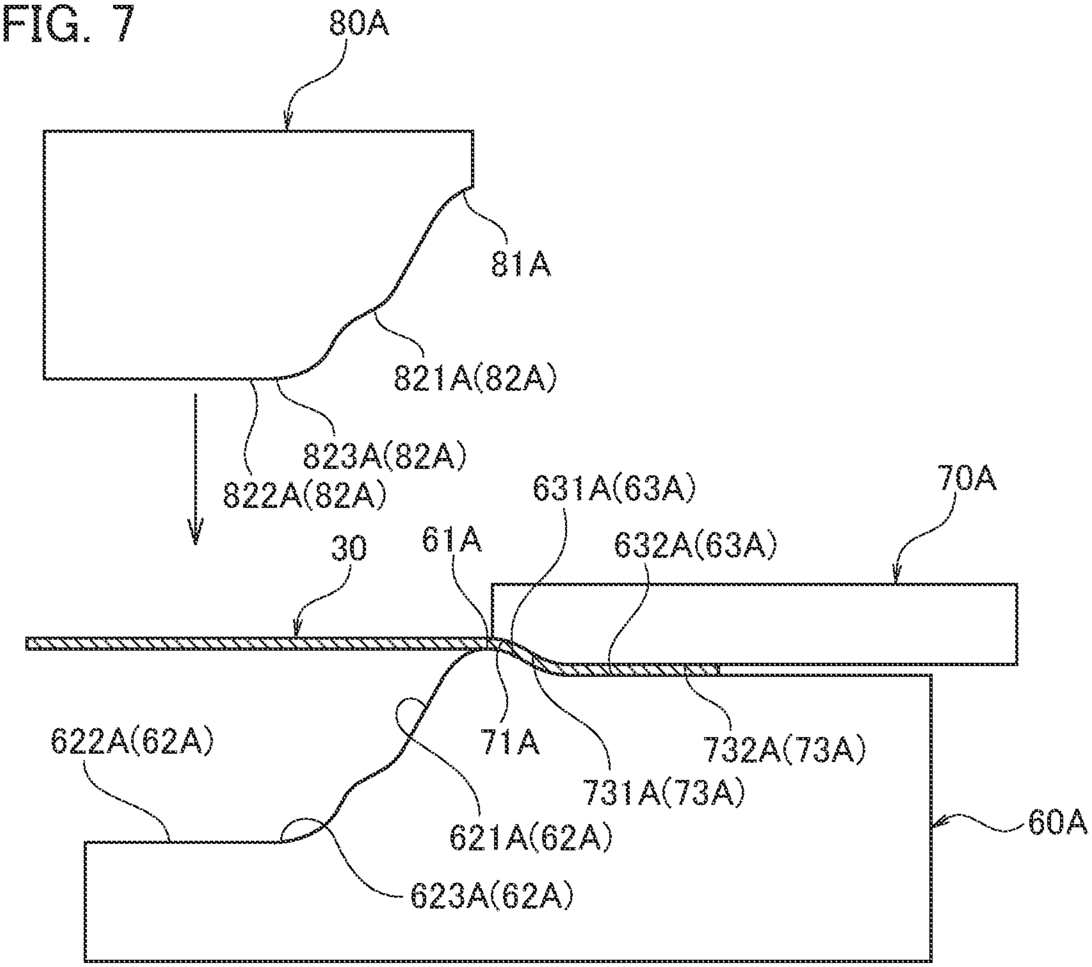
FIG. 7 is a cross-sectional view schematically showing the blank clamped between the punch and the pad in the press forming for obtaining the primary formed product according to the one embodiment.

Next, an example method of forming the primary formed product 40 by pressing the blank 30 with the above-described three dies will be described using FIGS. 7 and 8.

Firstly, the blank 30 is set on the lower die (primary formed product forming punch 60A) by using positioning pins or the like (not shown).

Then, the press not shown is driven to clamp the planned primary formed product apex part formation part 31 and the planned primary formed product concave-side wall part formation part 33 of the blank 30 between the lower die (primary formed product forming punch 60A) and the leading pad (primary formed product forming pad 70A), so that the blank 30 is positionally stabilized. At this time, as shown in FIG. 7, the concavely curved side of the blank 30 is slightly form-molded by the leading pad (primary formed product forming pad 70A). Specifically, the concave side of the primary formed product apex part 41 and the primary formed product concave-side wall part 43 (primary formed product concave-side slanted wall portion 431 and primary formed product concave-side intermediate flange 432) are formed.

As described above, in the present embodiment, the blank 30 is clamped between the lower die (primary formed product forming punch 60A) and the leading pad (primary formed product forming pad 70A) in a state where the concave side of the primary formed product apex part 41 and the primary formed product concave-side wall part 43 are formed. At this time, the planned primary formed product apex part formation part 31 and the planned primary formed product concave-side wall part formation part 33 clamped between the lower die (primary formed product forming punch 60A) and the leading pad (primary formed product forming pad 70A) are parts of the blank 30 excluding the part thereof at which to form the primary formed product convex-side wall part (the intermediate wall portion and the intermediate flange to be provided to be continuous with the intermediate wall portion) 42.

By slightly form-molding the concavely curved side of the blank 30 as above, the blank 30 can be firmly held with the lower die (primary formed product forming punch 60A) and the leading pad (primary formed product forming pad 70A). This makes it possible to more reliably prevent the blank 30 from being pulled in toward the convex side when the primary formed product convex-side wall part 42 is formed.

Thereafter, with the blank 30 held with the lower die (primary formed product forming punch 60A) and the leading pad (primary formed product forming pad 70A), the press not shown is driven to move the die (primary formed product forming bend die 80A) downward, so that the convexly curved side of the blank 30 is form-molded (pressed). As a result, the convex side of the primary formed product apex part 41 and the primary formed product convex-side wall part 42 are formed. That is, the primary formed product 40 is formed (see FIG. 8).

At this time, the slanted wall portion formed on the convex side undergoes a shrink flange deformation relative to the concave-side wall part. For this reason, compressive stress is exerted on the convexly curved-side slanted wall portion, which can be a cause of wrinkling. Wrinkling is more likely to occur particularly when a thinner high tensile strength steel sheet is used for weight reduction. Generally, in shrink flange deformation, the convex-side slanted wall portion is subjected to a large compressive stress and is thus prone to wrinkle when the sheet is thinner, when the curvature of the convex-side curved section is large, when the length of the convex-side slanted wall portion is large, and when the bend angle of the convex-side slanted wall portion increases.

Thus, if, when the blank 30 is pressed, the convex-side slanted wall portion is formed into the final finished shape at a stroke, the convex-side slanted wall portion will be subjected to a very large compressive stress and will therefore be more prone to wrinkle.

However, in the present embodiment, the convex-side slanted wall portion is formed through the two stages, namely, the primary formed product forming step and the secondary formed product forming step, as described above. Specifically, in the primary formed product forming step, the convex-side slanted wall portion is shaped partway (into an intermediate shape) to the final finished shape. In this way, the length of the convex-side slanted wall portion (primary formed product convex-side slanted wall portion 421) formed in the primary formed product forming step can be relatively short. Accordingly, the compressive stress exerted on the convex-side slanted wall portion is relatively small.

Figure 11:
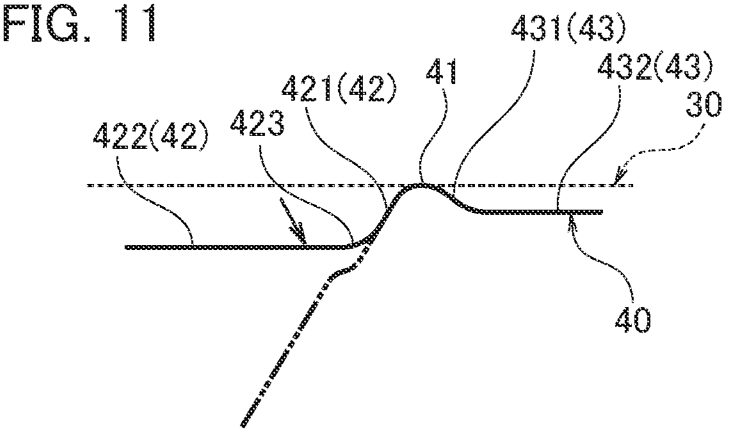
FIG. 11 is a cross-sectional view taken along line A-A of FIG. 9.
Figure 12:
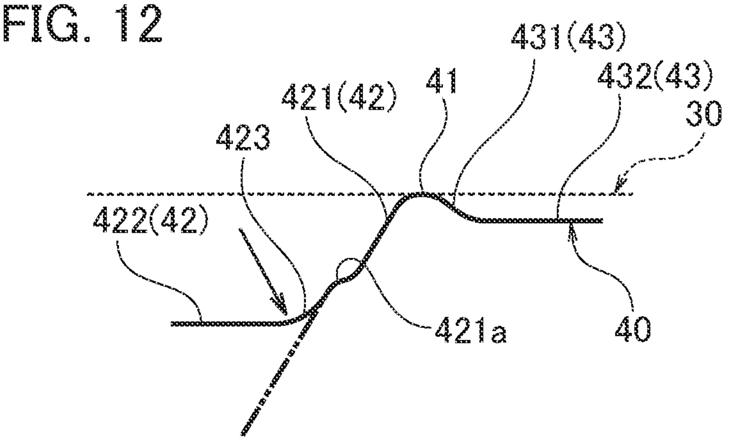
FIG. 12 is a cross-sectional view taken along line B-B of FIG. 9.
Figure 13:
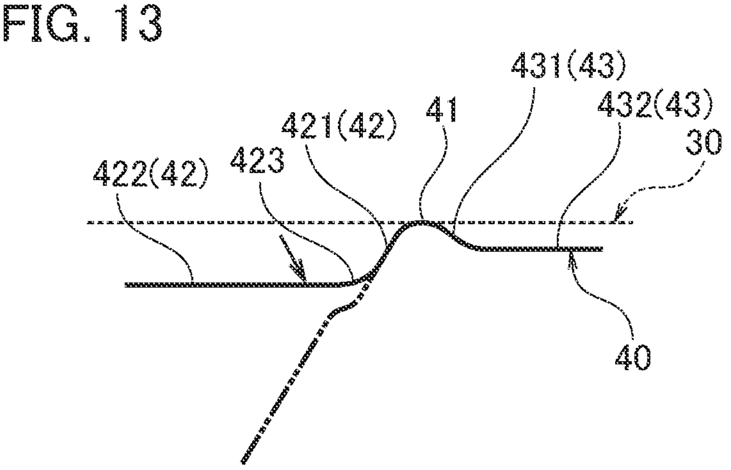
FIG. 13 is a cross-sectional view taken along line C-C of FIG. 9.

Here, in the present embodiment, in the primary formed product forming step, the primary formed product 40 is formed such that the pressing depth of the slanted wall portion at a large-curvature section on the convexly curved side is larger than that of the slanted wall portion at small-curvature sections, and that the slanted wall portion is shaped partway to the final shape to have a flange (see FIGS. 11 and 12).

Specifically, the primary formed product convex-side slanted wall portion (intermediate wall portion) 421 is formed such that the depth of the boundary valley line 423 between the primary formed product convex-side slanted wall portion (intermediate wall portion) 421 and the primary formed product convex-side intermediate flange 422 at the large-curvature section is larger than the depth of the boundary valley line 423 at the small-curvature sections.

Further, in the present embodiment, the boundary valley line 423 formed at the boundary portion between the primary formed product convex-side slanted wall portion 421 and the primary formed product convex-side intermediate flange 422 is formed so as to slant gradually from the large-curvature section toward the small-curvature sections.

Thus, as shown in FIG. 10, when the primary formed product convex-side slanted wall portion 421 is viewed with the primary formed product apex part 41 positioned at the top and the primary formed product convex-side intermediate flange 422 extending substantially horizontally, the boundary valley line 423 is formed deeper at a center portion of the convex-side curved section 40*a*, where the curvature is large, and is formed shallow on the longitudinally outer sides, where the curvature is small. That is, the boundary valley line 423 is in a gentle V-shape when the primary formed product convex-side slanted wall portion 421 is viewed with the primary formed product apex part 41 positioned at the top and the primary formed product convex-side intermediate flange 422 extending substantially horizontally.

Here, at the center section, where the curvature is large, the depth of the boundary valley line 423 formed in the primary formed product forming step (the working depth of the primary formed product convex-side slanted wall portion 421) is preferably, for example, a dimension that is roughly ⅓ to ⅔ of the working depth of the slanted wall portion in the finished state (the length of the convex-side slanted wall portion at the end of the secondary formed product forming step). On the longitudinally outer sides, where the curvature is small, the depth of the boundary valley line 423 formed in the primary formed product forming step is preferably a dimension that is roughly 0 to ¼ of the working depth of the slanted wall portion in the finished state (the length of the convex-side slanted wall portion at the end of the secondary formed product forming step). Note that the optimal depth of the boundary valley line 423 formed in the primary formed product forming step can be calculated from the shrinkage percentage of the material to be used (the shrinkage percentage of the SPFC steel sheet in the present embodiment).

In the present embodiment, in order to form the primary formed product 40 with such a shape, the blank 30 is form-molded with the die (primary formed product forming bend die 80A).

As described above, this die (primary formed product forming bend die 80A) includes the primary formed product convex-side slanted wall portion formation surface (intermediate wall portion formation surface: sidewall portion formation surface) 821A concavely curved along the longitudinal direction in a plan view, and the primary formed product convex-side intermediate flange formation surface (intermediate flange formation surface: flange formation surface) 822A provided to be continuous with the surface 821A.

Further, in the present embodiment, the boundary ridge line 823A configured to form the boundary valley line of the primary formed product is formed at the boundary portion between the primary formed product convex-side slanted wall portion formation surface 821A and the primary formed product convex-side intermediate flange formation surface 822A. Moreover, the height of the boundary ridge line 823A between the primary formed product convex-side slanted wall portion formation surface 821A and the primary formed product convex-side intermediate flange formation surface 822A at a large-curvature section is larger than the height of the boundary ridge line 823A at small-curvature sections. That is, the boundary ridge line 823A is formed such that a center section, where the curvature is large, protrudes upward farther than the longitudinally outer sides, where the curvature is small, when the lower surface of the die (primary formed product forming bend die 80A) is oriented upward (see FIG. 6).

Further, in the present embodiment, the die (primary formed product forming bend die 80A) is formed such that the boundary ridge line 823A slants gradually from the large-curvature section toward the small-curvature sections. That is, the boundary ridge line 823A is in a gentle V-shape when the die (primary formed product forming bend die 80A) is viewed with its lower surface oriented downward.

Similarly, the lower die (primary formed product forming punch 60A) includes the primary formed product convex-side slanted wall portion formation surface 621A convexly curved along the longitudinal direction in a plan view, and the primary formed product convex-side intermediate flange formation surface 622A provided to be continuous with the surface 621A. Further, the boundary valley line 623A configured to form the boundary valley line of the primary formed product is formed at the boundary portion between the primary formed product convex-side slanted wall portion formation surface 621A and the primary formed product convex-side intermediate flange formation surface 622A.

Here, in the present embodiment, with the lower die (primary formed product forming punch 60A) too, the height of the boundary valley line 623A between the primary formed product convex-side slanted wall portion formation surface 621A and the primary formed product convex-side intermediate flange formation surface 622A at a large-curvature section is larger than the height of the boundary valley line 623A at small-curvature sections. That is, the boundary valley line 623A is formed such that a center section, where the curvature is large, is positioned lower than the longitudinally outer sides, where the curvature is small, when the upper surface of the lower die (primary formed product forming punch 60A) is oriented upward (see FIG. 4).

Further, in the present embodiment, the lower die (primary formed product forming punch 60A) is also formed such that the boundary valley line 623A slants gradually from the large-curvature section toward the small-curvature sections. That is, the boundary valley line 623A is in a gentle V-shape when the lower die (primary formed product forming punch 60A) is viewed with its upper surface oriented upward.

Thus, when the primary formed product 40 is formed by pressing with these dies, the large-curvature section of the die (primary formed product forming bend die 80A) comes into contact with the blank 30 first and then the longitudinally outer sections, where the curvature is small, gradually come into contact with the blank 30 to form-mold the primary formed product convex-side slanted wall portion 421. Meanwhile, in reality, the continuous motion of the die (primary formed product forming bend die 80A) to gradually come into contact with the blank 30 is extremely small since the V-shape is extremely gentle.

Thus, when the primary formed product 40 is formed, the blank 30 is gradually bent from the center portion of the convex-side curved section 40*a*, where the curvature is large, toward the longitudinally outer sides, where the curvature is small, by using the die (primary formed product forming bend die 80A) according to the present embodiment. This reduces the compressive stress to be generated in the vicinity of the convex-side curved section 40*a* and therefore prevents wrinkling.

[Secondary Formed Product Forming Step]

Next, in the secondary formed product forming step, the primary formed product convex-side intermediate flange (flange) 422 formed in the primary formed product forming step is extended so as to be aligned with the intermediate wall portion 421 to form the secondary formed product 50 having a wall part (secondary formed product convex-side slanted wall portion) that will be the convex-side wall part 22 (convex-side slanted wall portion 221).

Figure 16:
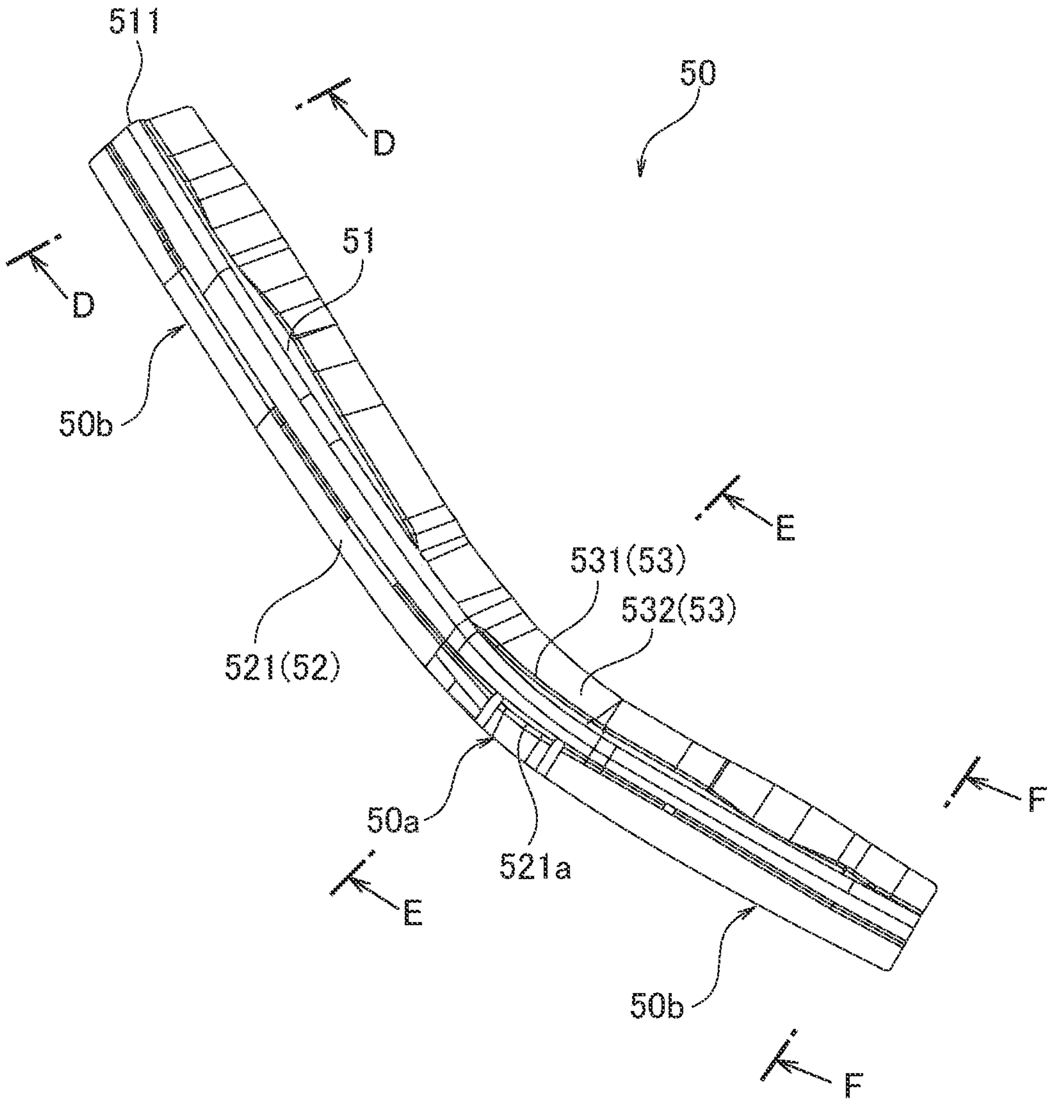
FIG. 16 is a perspective view schematically showing the secondary formed product according to the one embodiment.

Here, as shown in FIG. 16, a curved section 50*a* is formed at a longitudinal center section of the secondary formed product 50. This curved section 50*a* is formed such that its curvature becomes gradually smaller from a center portion toward both end portions. Moreover, straight sections 50*b* are formed which extend substantially straight respectively from both end portions of the curved section 50*a*, at which the curvature is small. Thus, the secondary formed product 50 formed in the secondary formed product forming step is curved to have an apex at a large-curvature portion of the curved section 50*a* at the longitudinal center section, and the curvature becomes smaller toward both longitudinally outer sides (both longitudinal sides are substantially straight).

Figure 15:
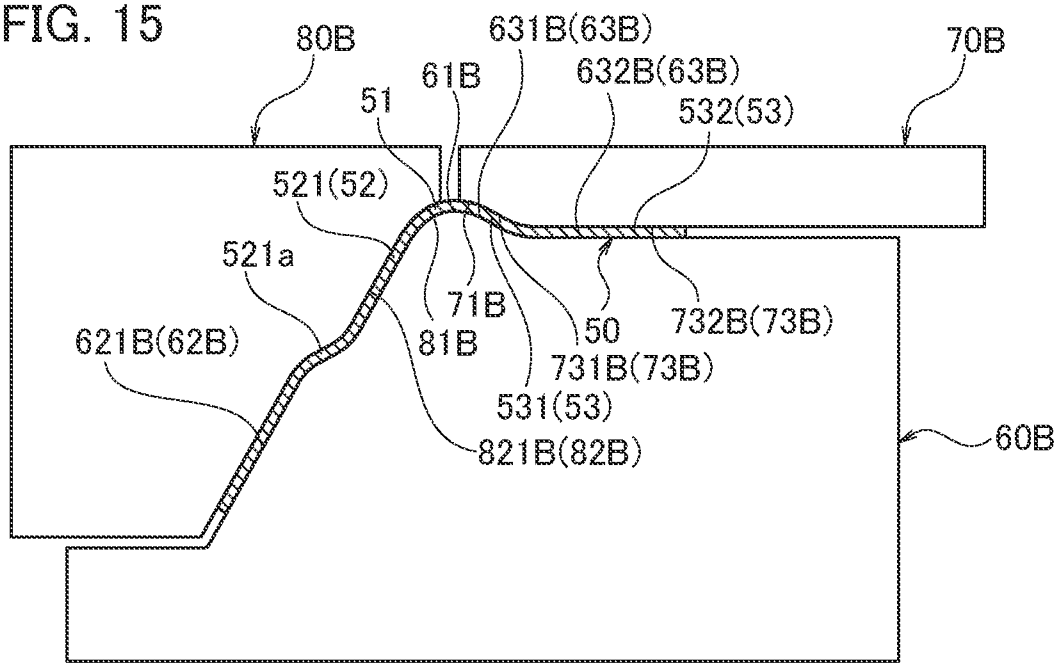
FIG. 15 is a cross-sectional view schematically showing the primary formed product clamped between the punch and the pad, press-formed with a die in the press forming for obtaining the secondary formed product according to the one embodiment.
Figure 17:
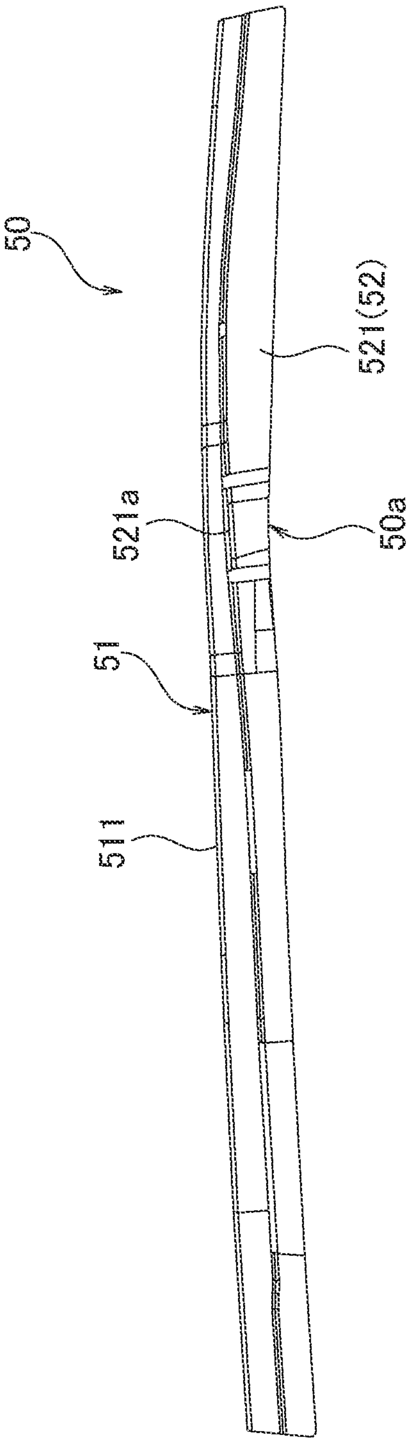
FIG. 17 is a view schematically showing the side surface of a convexly curved side of the secondary formed product according to the one embodiment.
Figure 18:
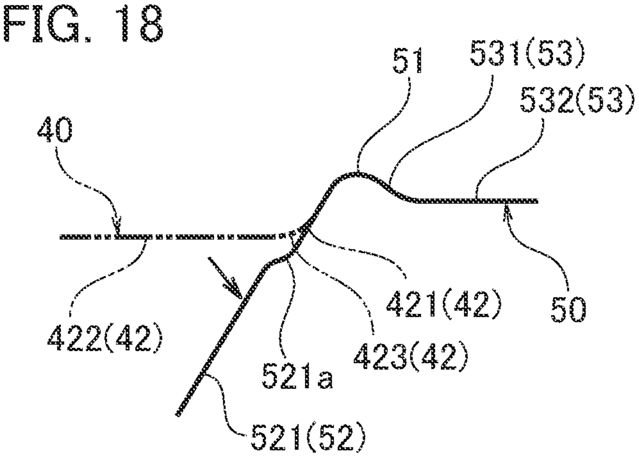
FIG. 18 is a cross-sectional view taken along line D-D of FIG. 16.
Figure 19:
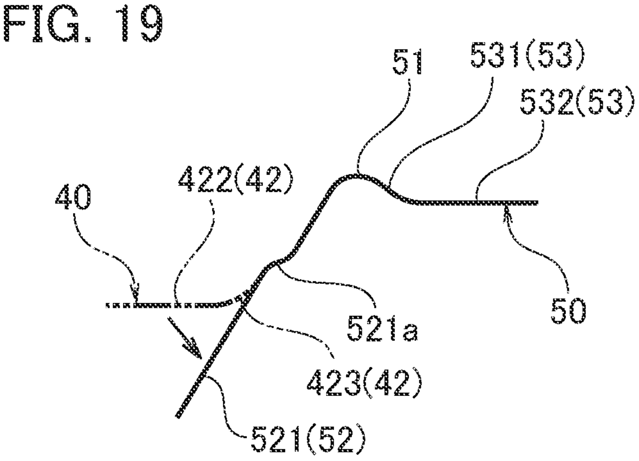
FIG. 19 is a cross-sectional view taken along line E-E of FIG. 16.
Figure 20:
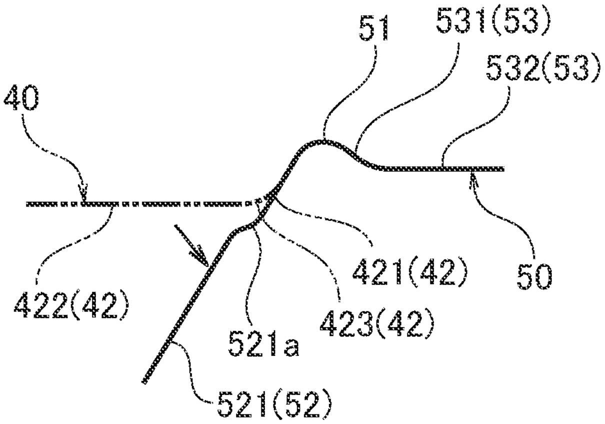
FIG. 20 is a cross-sectional view taken along line F-F of FIG. 16.

Also, as shown in FIGS. 15 to 17, the secondary formed product 50 includes a secondary formed product apex part 51 curved along the longitudinal direction in a plan view, and this secondary formed product apex part 51 includes an arc portion 511 being convex upward. Specifically, the secondary formed product apex part 51 is in a substantially arc shape in a cross-sectional view taken along a plane crossing the longitudinal direction.

Moreover, a secondary formed product convex-side wall part 52 is provided to be continuous with the lower end of the secondary formed product apex part 51 on one side (the convexly curved side in the plan view) and a secondary formed product concave-side wall part 53 is provided to be continuous with the lower end of the secondary formed product apex part 51 on the other side (the concavely curved side in the plan view).

In the present embodiment, the secondary formed product convex-side wall part 52 includes a secondary formed product convex-side slanted wall portion 521 extending downward and outward (toward an outer side in the width direction). Note that the secondary formed product convex-side slanted wall portion 521 is formed along a convexly curved wall portion of the secondary formed product apex part 51 so as to be convexly curved along the longitudinal direction. Moreover, a step portion 521*a* is formed at a substantially center portion of the secondary formed product convex-side slanted wall portion 521 in the vertical direction at a section corresponding to the curved section 50*a*.

The secondary formed product concave-side wall part 53 includes a secondary formed product concave-side slanted wall portion 531 extending downward and outward (toward an outer side in the width direction) and a secondary formed product concave-side flange 532 provided to be continuous with the lower end of the secondary formed product concave-side slanted wall portion 531. Note that the secondary formed product concave-side slanted wall portion 531 is formed along a concavely curved wall portion of the secondary formed product apex part 51 so as to be concavely curved along the longitudinal direction.

Figure 14:
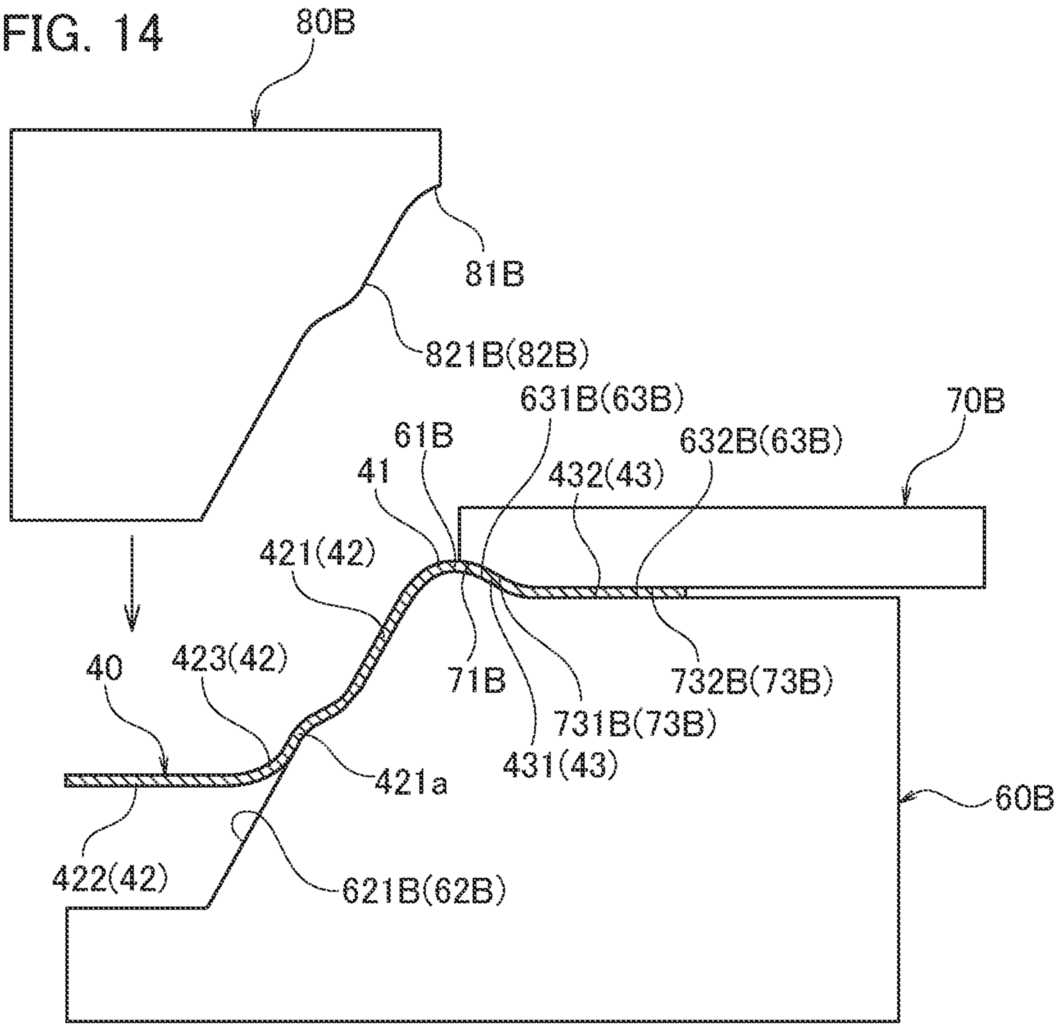
FIG. 14 is a cross-sectional view schematically showing the primary formed product clamped between a punch and a pad in press forming for obtaining a secondary formed product according to the one embodiment.

In the present embodiment, as shown in FIGS. 14 and 15, the primary formed product 40 is set between a lower die (secondary formed product forming punch 60B) which is disposed at the bottom and a leading pad (secondary formed product forming pad 70B) and die (secondary formed product forming bend die 80B) which are disposed at the top, and the primary formed product 40 is pressed with these three dies to form the secondary formed product 50.

Here, a part of the upper surface of the lower die (secondary formed product forming punch 60B) has a shape corresponding to the shape of the secondary formed product 50. Specifically, as shown in FIGS. 14 and 15, the upper surface of the lower die (secondary formed product forming punch 60B) includes a secondary formed product apex part formation surface 61B, a secondary formed product convex-side wall part formation surface 62B, and a secondary formed product concave-side wall part formation surface 63B.

Further, the secondary formed product convex-side wall part formation surface 62B includes a secondary formed product convex-side slanted wall portion formation surface 621B convexly curved along the longitudinal direction in a plan view.

The secondary formed product concave-side wall part formation surface 63B includes a secondary formed product concave-side slanted wall portion formation surface 631B concavely curved along the longitudinal direction in the plan view, and a secondary formed product concave-side intermediate flange formation surface 632B provided to be continuous with the surface 631B. Here, in the present embodiment, the shape of the secondary formed product apex part formation surface 61B of the lower die (secondary formed product forming punch 60B) is the same as the shape of the primary formed product apex part formation surface 61A of the lower die (primary formed product forming punch 60A). Also, the shape of the secondary formed product concave-side wall part formation surface 63B of the lower die (secondary formed product forming punch 60B) is the same as the shape of the primary formed product concave-side wall part formation surface 63A of the lower die (primary formed product forming punch 60A).

Also, a part of the lower surface of the leading pad (secondary formed product forming pad 70B) has a shape corresponding to the shape of the concave side of the secondary formed product apex part 51 and the secondary formed product concave-side wall part 53. Specifically, as shown in FIGS. 14 and 15, the lower surface of the leading pad (secondary formed product forming pad 70B) includes a secondary formed product apex part concave side formation surface 71B and a secondary formed product concave-side wall part formation surface 73B. Further, the secondary formed product concave-side wall part formation surface 73B includes a secondary formed product concave-side slanted wall portion formation surface 731B convexly curved along the longitudinal direction in a plan view, and a secondary formed product concave-side intermediate flange formation surface 732B provided to be continuous with the surface 731B. Here, in the present embodiment, the shape of the leading pad (secondary formed product forming pad 70B) is the same as the shape of the leading pad (primary formed product forming pad 70A). Thus, the shape of the concave side of the secondary formed product apex part 51 and the secondary formed product concave-side wall part 53 is the same as the shape of the concave side of the primary formed product apex part 41 and the primary formed product concave-side wall part 43.

Also, a part of the lower surface of the die (secondary formed product forming bend die 80B) has a shape corresponding to the shape of the convex side of the secondary formed product apex part 51 and the secondary formed product convex-side wall part 52. Specifically, as shown in FIGS. 14 and 15, the lower surface of the die (secondary formed product forming bend die 80B) includes a secondary formed product apex part convex side formation surface 81B and a secondary formed product convex-side wall part formation surface 82B. Further, the secondary formed product convex-side wall part formation surface 82B includes a secondary formed product convex-side slanted wall portion formation surface 821B concavely curved along the longitudinal direction in a plan view.

Next, an example method of forming the secondary formed product 50 by pressing the primary formed product 40 with the above-described three dies will be described using FIGS. 14 and 15.

Firstly, the primary formed product 40 is set on the lower die (secondary formed product forming punch 60B) by using positioning pins or the like (not shown).

Then, the press not shown is driven to clamp the concave side of the primary formed product apex part 41 and the primary formed product concave-side wall part 43 between the lower die (secondary formed product forming punch 60B) and the leading pad (secondary formed product forming pad 70B), so that the primary formed product 40 is positionally stabilized.

In the present embodiment, since the concavely curved side of the blank 30 has been slightly form-molded in the previous step (primary formed product forming step), the primary formed product 40 can be firmly held with the lower die (secondary formed product forming punch 60B) and the leading pad (secondary formed product forming pad 70B). This makes it possible to more reliably prevent the primary formed product 40 from being pulled in toward the convex side when the secondary formed product convex-side wall part 52 is formed.

Thereafter, with the primary formed product 40 held with the lower die (secondary formed product forming punch 60B) and the leading pad (secondary formed product forming pad 70B), the press not shown is driven to move the die (secondary formed product forming bend die 80B) downward, so that the convexly curved side of the primary formed product 40 is form-molded (pressed). As a result, the convex side of the secondary formed product apex part 51 and the secondary formed product convex-side wall part 52 are formed. That is, the secondary formed product 50 is formed (see FIG. 15). At this time, the intermediate flange 422 is extended by the die (secondary formed product forming bend die 80B) such that the secondary formed product convex-side wall part 52 having the same shape as the convex-side wall part 22 shown in FIG. 2 (the convex-side wall part 22 without the trimming-piercing step) is formed.

As described above, in the present embodiment, the secondary formed product forming step is a flange down step of further extending the convexly curved-side intermediate flange 422 formed in the primary formed product forming step with the die (secondary formed product forming bend die 80B).

Also, in the secondary formed product forming step according to the present embodiment, the secondary formed product 50 is formed by pressing the primary formed product 40 in a state where the portion of the primary formed product 40 excluding the intermediate wall portion 421 and the intermediate flange 422 is held with the leading pad (secondary formed product forming pad 70B).

Here, in the present embodiment, the lower surface of the die (secondary formed product forming bend die 80B) is in a gentle V-shape corresponding to the boundary valley line 423 formed in the primary formed product forming step.

When the primary formed product 40 is pressed, the lower surface of the die (secondary formed product forming bend die 80B) comes into contact with the entire boundary valley line 423 substantially at the same time to bend (form-mold) the intermediate flange 422.

Note that the lower surface of the die (secondary formed product forming bend die 80B) does not have to be in the gentle V-shape corresponding to the boundary valley line 423 formed in the primary formed product forming step, and may be in the shape of a horizontally flat surface. However, in the case where the lower surface of the die (secondary formed product forming bend die 80B) is in the shape of a horizontally flat surface, the bending (form-molding) of the intermediate flange 422 starts from both longitudinally outer sides of the intermediate flange 422, and the final working starts from portions around the center, at which the curvature is large. Accordingly, in the bending (stretch forming) of the intermediate flange 422, the slanted wall portion around the center, at which stress tends to concentrate, is more likely to wrinkle than in the case where the lower surface of the die (secondary formed product forming bend die 80B) is formed to correspond to the boundary valley line 423.

As described above, the primary formed product 40 has an intermediate flange shape, and the convex-side slanted wall portion has been formed partway to the final shape. Moreover, the primary formed product convex-side slanted wall portion 421 has undergone a shrink flange deformation relative to the concave-side wall part.

However, in the present embodiment, the boundary valley line 423 formed at the boundary portion between the primary formed product convex-side slanted wall portion 421 and the primary formed product convex-side intermediate flange 422 is in a gentle V-shape when the primary formed product convex-side slanted wall portion 421 is viewed with the primary formed product apex part 41 positioned at the top and the primary formed product convex-side intermediate flange 422 extending substantially horizontally.

Hence, the primary formed product convex-side slanted wall portion 421 has undergone a stretch flange deformation relative to the intermediate flange 422 formed at longitudinal end sections (a stretch flange deformation in the height direction due to the shape of the boundary valley line 423).

Also, as described above, the forming of the secondary formed product 50 (flange down) is working involving flange down of the intermediate flange 422 relative to the primary formed product convex-side slanted wall portion 421, in which the intermediate flange 422 undergoes a shrink flange deformation relative to the primary formed product convex-side slanted wall portion 421 (a shrink flange deformation occurring due to the product curvature).

Thus, in the secondary formed product forming step according to the present embodiment, the secondary formed product convex-side wall part 52 is formed in a state where the stretch and shrinkage cancel each other out with the stretch flange deformation in the height direction due to the shape of the boundary valley line 423 and the shrink flange deformation occurring due to the product curvature. This makes it possible to more reliably prevent wrinkling of the secondary formed product convex-side wall part 52.

[Restrike Bending Step]

Next, in the restrike bending step (concave-side wall part forming step), the secondary formed product concave-side wall part 53 formed in the secondary formed product forming step is subjected to restrike bending (pressing) to form the secondary formed product concave-side wall part 53 into the final product shape (the shape of the concave-side wall part 23 shown in FIG. 2 in the present embodiment). Specifically, the restrike bending step (concave-side wall part forming step) is a step of forming the front pillar outer reinforcement (press-formed product) 20 having the shape shown in FIG. 2 (the same as the product shape without the trimming-piercing step) by using the secondary formed product formed in the secondary formed product forming step.

Figure 21:
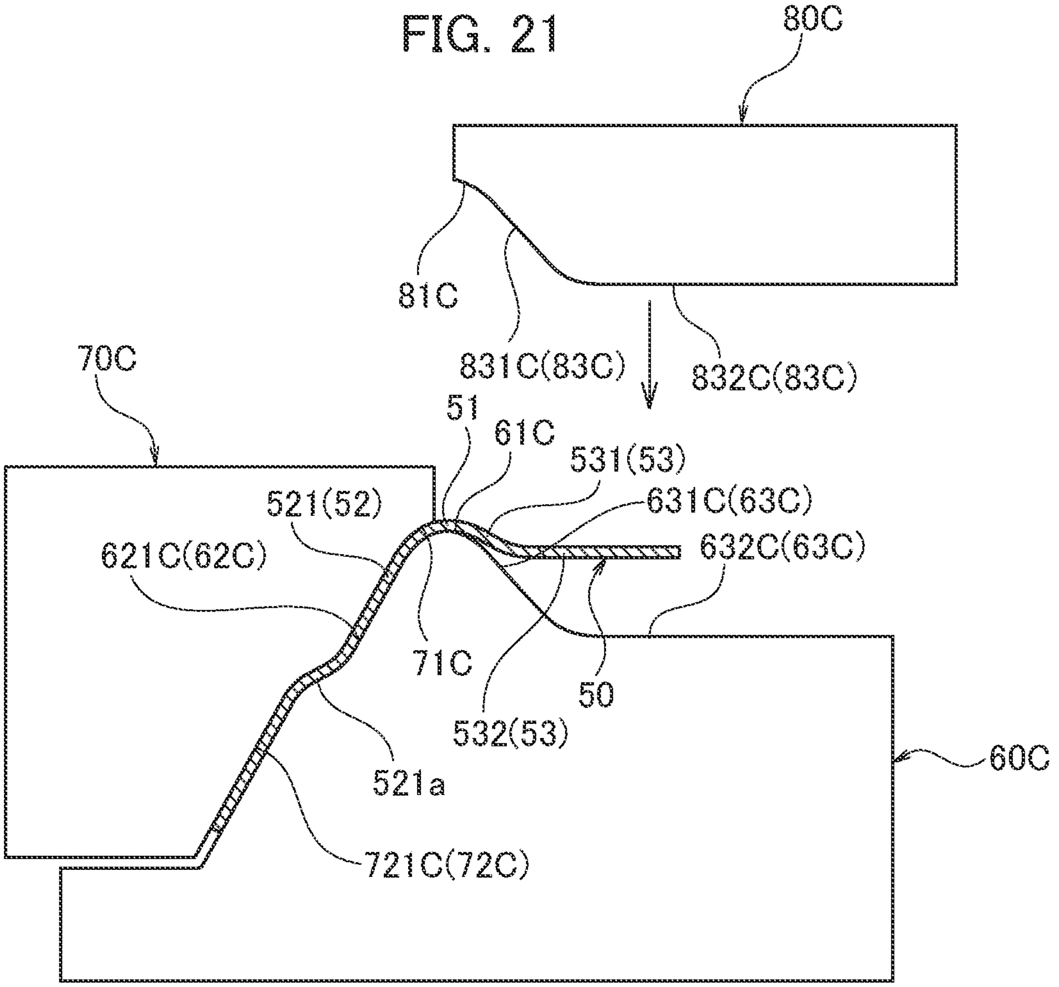
FIG. 21 is a cross-sectional view schematically showing the secondary formed product clamped between a punch and a pad in press forming for obtaining the press-formed product according to the one embodiment.
Figure 22:
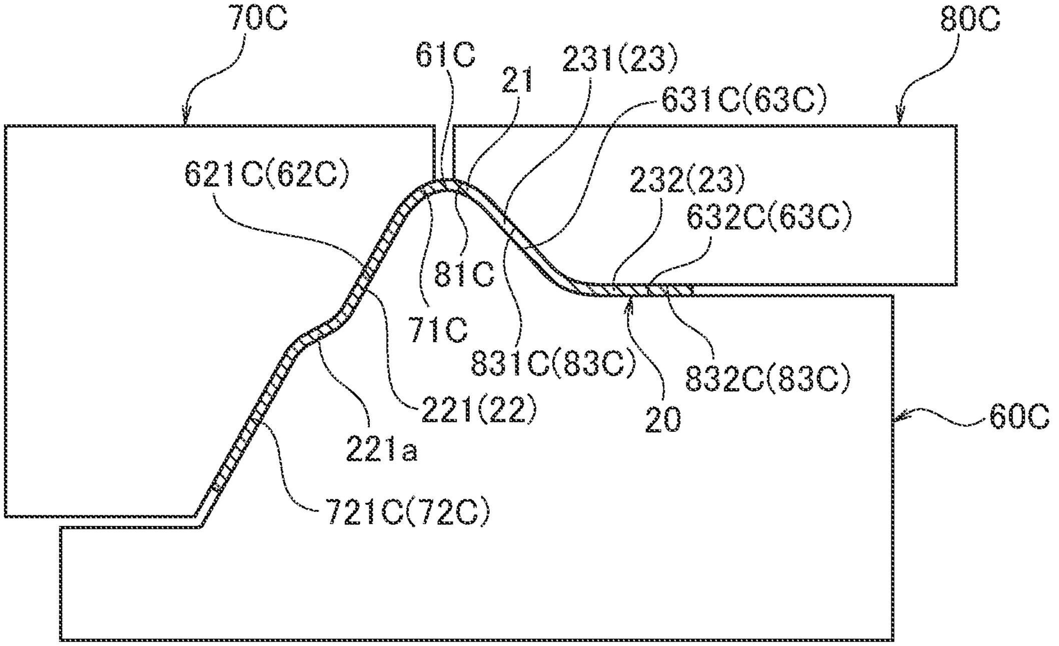
FIG. 22 is a cross-sectional view schematically showing the secondary formed product clamped between the punch and the pad, press-formed with a die in the press forming for obtaining the press-formed product according to the one embodiment.

In the present embodiment, as shown in FIGS. 21 and 22, the secondary formed product 50 is set between a lower die (press-formed product forming punch 60C) which is disposed at the bottom and a leading pad (press-formed product forming pad 70C) and die (press-formed product forming bend die 80C) which are disposed at the top, and the secondary formed product 50 is pressed with these three dies to form the press-formed product 20 shown in FIG. 2.

Here, a part of the upper surface of the lower die (press-formed product forming punch 60C) has a shape corresponding to the shape of the press-formed product 20 shown in FIG. 2. Specifically, as shown in FIGS. 21 and 22, the upper surface of the lower die (press-formed product forming punch 60C) includes an apex part formation surface 61C, a convex-side wall part formation surface 62C, and a concave-side wall part formation surface 63C.

Further, the convex-side wall part formation surface 62C includes a convex-side slanted wall portion formation surface 621C convexly curved along the longitudinal direction in a plan view.

The concave-side wall part formation surface 63C includes a concave-side slanted wall portion formation surface 631C concavely curved along the longitudinal direction in the plan view, and a concave-side intermediate flange formation surface 632C provided to be continuous with the surface 631C. Here, in the present embodiment, the shape of the apex part formation surface 61C of the lower die (press-formed product forming punch 60C) is the same as the shape of the secondary formed product apex part formation surface 61B of the lower die (secondary formed product forming punch 60B). Also, the shape of the convex-side wall part formation surface 62C of the lower die (press-formed product forming punch 60C) is the same as the shape of the secondary formed product convex-side wall part formation surface 62B of the lower die (secondary formed product forming punch 60B).

Also, a part of the lower surface of the leading pad (press-formed product forming pad 70C) has a shape corresponding to the shape of the convex side of the apex part 21 and the convex-side wall part 52. Specifically, as shown in FIGS. 21 and 22, the lower surface of the leading pad (press-formed product forming pad 70C) includes an apex part convex side formation surface 71C and a convex-side wall part formation surface 72C. Further, the convex-side wall part formation surface 72C includes a convex-side slanted wall portion formation surface 721C concavely curved along the longitudinal direction in a plan view. Here, in the present embodiment, the shape of the leading pad (press-formed product forming pad 70C) is the same as the shape of the die (secondary formed product forming bend die 80B). Thus, the shape of the convex side of the press-formed product apex part 21 and the press-formed product convex-side wall part 22 is the same as the shape of the convex side of the secondary formed product apex part 51 and the secondary formed product convex-side wall part 52.

Also, a part of the lower surface of the die (press-formed product forming bend die 80C) has a shape corresponding to the shape of the concave side of the apex part 21 and the concave-side wall part 23. Specifically, as shown in FIGS. 21 and 22, the lower surface of the die (press-formed product forming bend die 80C) includes a press-formed product apex part concave side formation surface 81C and a press-formed product concave-side wall part formation surface 83C. Also, the press-formed product concave-side wall part formation surface 83C includes a press-formed product concave-side slanted wall portion formation surface 831C convexly curved along the longitudinal direction in a plan view, and a concave-side intermediate flange formation surface 832C provided to be continuous with the surface 831C.

Next, an example method of forming the press-formed product 20 by pressing the secondary formed product 50 with the above-described three dies will be described using FIGS. 21 and 22.

Firstly, the secondary formed product 50 is set on the lower die (press-formed product forming punch 60C) by using positioning pins or the like (not shown).

Then, the press not shown is driven to clamp the convex side of the secondary formed product apex part 51 and the secondary formed product convex-side wall part 52 between the lower die (press-formed product forming punch 60C) and the leading pad (press-formed product forming pad 70C), so that the secondary formed product 50 is positionally stabilized.

In the present embodiment, since the convexly curved side of the secondary formed product 50 has been form-molded in the previous step (secondary formed product forming step), the secondary formed product 50 can be firmly held with the lower die (press-formed product forming punch 60C) and the leading pad (press-formed product forming pad 70C). This makes it possible to more reliably prevent the secondary formed product 50 from being pulled in toward the concave side when the press-formed product concave-side wall part 23 is formed.

Thereafter, with the secondary formed product 50 held with the lower die (press-formed product forming punch 60C) and the leading pad (press-formed product forming pad 70C), the press not shown is driven to move the die (press-formed product forming bend die 80C) downward, so that the concavely curved side of the secondary formed product 50 (secondary formed product concave-side slanted wall portion 531 and secondary formed product concave-side intermediate flange 532) is form-molded (pressed). As a result, the concave side of the press-formed product apex part 21 and the press-formed product concave-side wall part 23 are formed. That is, the press-formed product 20 is formed (see FIG. 2).

Note that in the present embodiment, the secondary formed product concave-side slanted wall portion 531 has undergone a stretch flange deformation relative to the convex-side curved section and therefore has a possibility of cracking. However, in the case of the shape of the press-formed product 20 described in the present embodiment, the secondary formed product concave-side slanted wall portion 531 is not worked as deep as the length of the convex-side slanted wall portion 221. Accordingly, the possibility of cracking is relatively low.

Also, the working of the flange 232, extending from the concave-side slanted wall portion 231, relative to the concave-side slanted wall portion 231 is a shrink flange deformation. Thus, there is a possibility of wrinkling. However, since the product shape is such that the length of the concave-side slanted wall portion 231 is small, the possibility of wrinkling is also relatively low.

This restrike bending step is simply stamping for shaping the final product.

[Trimming-Piercing Step]

Lastly, in order to complete the outer shape of the press-formed product 20, the trimming-piercing step is performed to form notches, through-holes, etc. in the press-formed product 20. The positions, etc. of such notches and through-holes to be formed are determined according to how the actual product is to be used. In this trimming-piercing step, a publicly known conventional technique can be used.

[Modification of Press-Formed Product]

Figure 23:
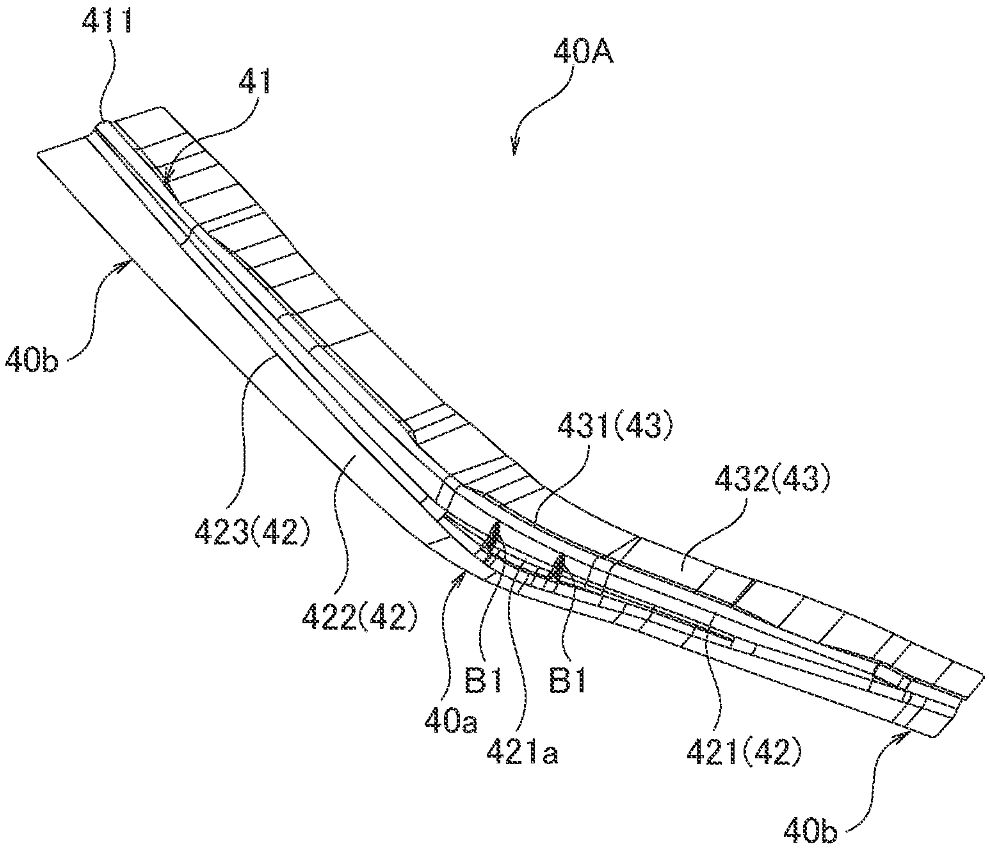
FIG. 23 is a perspective view schematically showing a primary formed product according to one modification.
Figure 24:
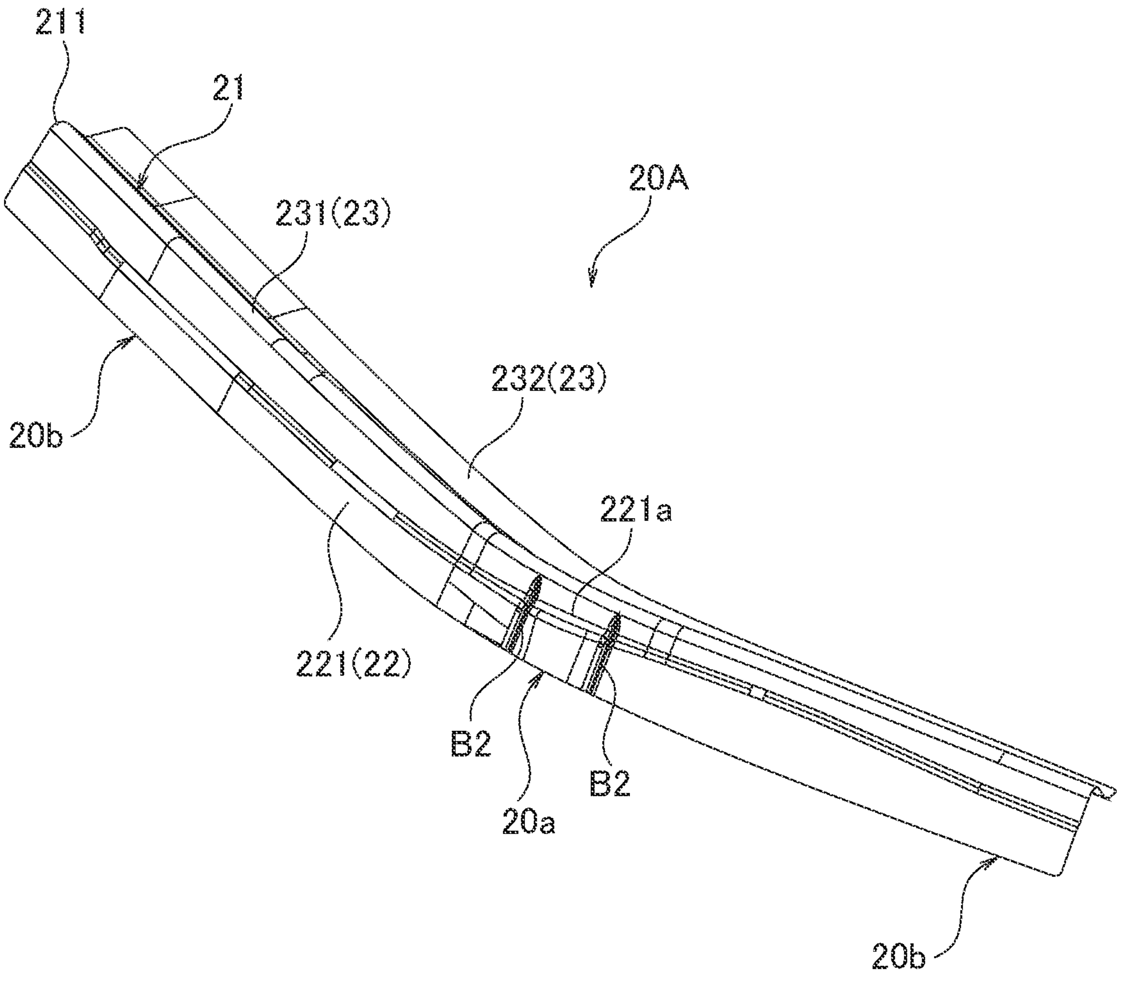
FIG. 24 is a perspective view schematically showing a press-formed product according to the one modification.

Note that the press-formed product manufacturing method described in the present embodiment may be used to form a primary formed product 40A shown in FIG. 23 and a front pillar outer reinforcement (press-formed product) 20A shown in FIG. 24.

FIG. 23 discloses the primary formed product 40A formed in the primary formed product forming step. The primary formed product 40A formed in the primary formed product forming step differs from the primary formed product 40 described in the above embodiment in that a pair of vertically extending beads B1 are formed in the curved section 40*a* or its vicinities, which are prone to wrinkling. Note that the other features of the configuration of the primary formed product 40A are the same as those of the primary formed product 40, and description thereof is therefore omitted.

The beads are formed in order to prevent wrinkling when the convexly curved section has a large curvature. Thus, by forming the beads B1 in the curved section 40*a* or its vicinities when the primary formed product 40A is formed in the primary formed product forming step, it is possible to more reliably prevent wrinkling of the primary formed product convex-side slanted wall portion 421 when the primary formed product 40A is formed.

Also, FIG. 24 discloses the front pillar outer reinforcement (press-formed product) 20A formed by performing the secondary formed product forming step, the restrike bending step, and the trimming-piercing step on the primary formed product 40A formed in the primary formed product forming step. This front pillar outer reinforcement (press-formed product) 20A differs from the front pillar outer reinforcement (press-formed product) 20 described in the above embodiment in that a pair of vertically extending beads B2 are formed in the curved section 20*a* or its vicinities, which are prone to wrinkling. Note that the other features of the configuration of the front pillar outer reinforcement (press-formed product) 20A are the same as those of the front pillar outer reinforcement (press-formed product) 20, and description thereof is therefore omitted.

By forming the beads B2 in the curved section 20*a* or its vicinities of the front pillar outer reinforcement (press-formed product) 20A as described above, it is possible to more reliably prevent wrinkling of the convex-side slanted wall portion 221 when the front pillar outer reinforcement (press-formed product) 20A is formed.

Note that FIGS. 23 and 24 show an example where beads are formed also in the primary formed product forming step. However, no beads may be formed in the primary formed product forming step and beads may be formed in the secondary formed product forming step.

The beads formed in this case are intended to further prevent wrinkling due to the shrink flange deformation that occurs when flange down of the intermediate flange formed in the primary formed product forming step is performed.

Here, in view of the strength of products, it is desirable not to include beads. Hence, front pillar outer reinforcements as press-formed products are also designed not to include wrinkling prevention beads as much as possible. That is, wrinkling prevention beads are provided only when there is no other way to control wrinkling. Even in this case, the beads should desirably be as small as possible. Accordingly, it is preferable that they be formed so as not to extend over the slanted wall portion formed in the primary formed product forming step.

[Another Modification of Press-Formed Product]

Also, in the above embodiment, the front pillar outer reinforcement 20 has been exemplarily described whose apex part 21 curved along the longitudinal direction in a plan view includes the arc portion 211 being convex upward. Alternatively, a front pillar outer reinforcement 20B shown in FIG. 25 is also possible.

Figure 25:
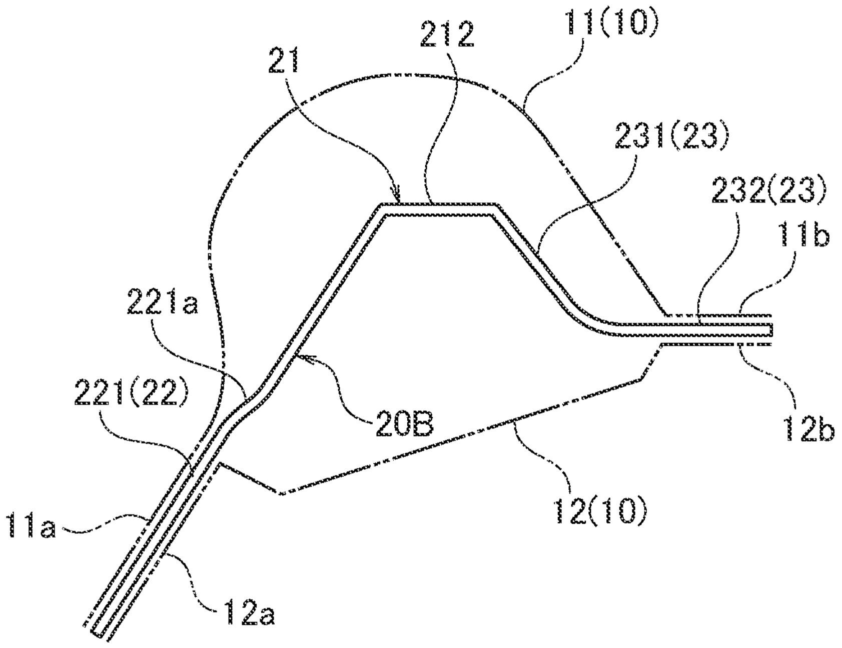
FIG. 25 is a cross-sectional view schematically showing a press-formed product according to another modification used as a part of a skeleton component configured to support a vehicle body.

The front pillar outer reinforcement 20B shown in FIG. 25 differs from the front pillar outer reinforcement 20 described in the above embodiment in that the apex part 21 curved along the longitudinal direction in a plan view includes a flat portion 212. Note that the other features of the configuration of the front pillar outer reinforcement 20B and the configuration of the front pillar 10 are the same as those described in the above embodiment, and description thereof is therefore omitted.

With such a substantially hat shape in a cross-sectional view taken along a plane crossing the longitudinal direction, the flat portion 212 can be held with a blank holder. This makes it possible to simultaneously form both the convex-side slanted wall portion and the concave-side slanted wall portion in the primary formed product forming step. That is, the forming of the primary formed product and the restrike bending can be performed in a single step. This makes it possible to omit the restrike bending, so that the method of manufacturing the front pillar outer reinforcement 20B includes a blank working step, a primary formed product forming step, a secondary formed product forming step, and a trimming-piercing step.

Here, if the flat portion 212 is narrow, for example, if the width of the flat portion 212 is 10 mm or less or so, the flat portion 212 cannot be held with a blank holder. In this case, the method of manufacturing the front pillar outer reinforcement 20B includes a blank working step, a primary formed product forming step, a secondary formed product forming step, a restrike bending step, and a trimming-piercing step.

[Operation and Advantageous Effects]

A description will be given below of the characteristic features of the press-formed product manufacturing method and the forming die described in the above embodiment, and advantageous effects achieved by these.

The press-formed product manufacturing method according to the present embodiment includes a pressing step of forming the press-formed product 20 by pressing, the press-formed product 20 having the apex part 21 curved along the longitudinal direction in a plan view and the convex-side wall part 22 provided to be continuous with the convexly curved side of the apex part 21.

This pressing step includes the primary formed product forming step of forming the primary formed product 40 having the intermediate wall portion 421 which will be a part of the convex-side wall part 22, and the intermediate flange 422 provided to be continuous with the intermediate wall portion 421, and the secondary formed product forming step of forming the secondary formed product 50 having the wall part 52, which will be the convex-side wall part 22, by extending at least a portion, on the intermediate wall portion 421 side, of the intermediate flange 422 formed in the primary formed product forming step such that at least the portion of the intermediate flange 422 on the intermediate wall portion 421 side is aligned with the intermediate wall portion 421.

In the primary formed product forming step, the intermediate wall portion 421 is formed such that the depth of the boundary valley line 423 between the intermediate wall portion 421 and the intermediate flange 422 at a large-curvature section is larger than the depth of the boundary valley line 423 at a small-curvature section.

By forming the convex-side wall part 22 through two stages, namely the primary formed product forming step and the secondary formed product forming step as described above, the length of the intermediate wall portion 421 formed in the primary formed product forming step can be relatively small. Accordingly, the compressive stress exerted on the intermediate wall portion 421 is relatively small. This makes it possible to more reliably prevent wrinkling of the intermediate wall portion 421 when the primary formed product forming step is performed.

Also, in the present embodiment, the depth of the boundary valley line 423 between the intermediate wall portion 421 and the intermediate flange 422 at a large-curvature section is larger than the depth of the boundary valley line 423 at a small-curvature section.

In this way, at the small-curvature section, the intermediate wall portion 421 can undergo a stretch flange deformation relative to the intermediate flange 422, and the intermediate flange 422 can undergo a shrink flange deformation relative to the intermediate wall portion 421 when the secondary formed product 50 is formed.

In this way, in the secondary formed product forming step, the secondary formed product convex-side wall part 52 is formed in a state where the stretch and shrinkage cancel each other out with the stretch flange deformation and the shrink flange deformation. This makes it possible to more reliably prevent wrinkling of the secondary formed product convex-side wall part 52.

As described above, according to the present embodiment, it is possible to implement a press-formed product manufacturing method capable of more reliably preventing wrinkling.

Also, by using the press-formed product manufacturing method according to the present embodiment, a press-formed product in which wrinkling can be more reliably prevented can be manufactured by normal cool working without using special equipment for hot working or the like. This enables production of a high-quality press-formed product without lowering productivity.

Further, by using the press-formed product manufacturing method according to the present embodiment, it is possible to prevent wrinkling on a product whose convex-side slanted wall portion 221 is long (e.g., a product whose slanted wall portion has a length of approximately 80 mm), a product whose convex-side curved section has a large curvature, a product whose convex-side slanted wall portion 221 has a large bend angle (e.g., a bend angle close to 90 degrees), and the like. This enables products as above to be formed by cold pressing, which can improve the degree of freedom in product design, and also eliminates the need for formation of wrinkling prevention beads or the like, which can further improve the degree of freedom in product design.

Also, by using the press-formed product manufacturing method according to the present embodiment, a press-formed product can be manufactured by form molding. Thus, a large die like a drawing die does not need to be used. This enables simplification of the die and a reduction of the die cost. Moreover, by manufacturing a press-formed product by form molding, it is possible to improve the product yield.

Also, in the primary formed product forming step, the primary formed product 40 may be formed by form molding using the primary formed product forming bend die 80A having the intermediate wall portion formation surface 821A concavely curved along the longitudinal direction in the plan view and configured to form the intermediate wall portion 421, and the intermediate flange formation surface 822A provided to be continuous with the intermediate wall portion formation surface 821A and configured to form the intermediate flange 422. Moreover, the primary formed product forming bend die 80A used at this time may be such that the height of the boundary ridge line 823A between the intermediate wall portion formation surface 821A and the intermediate flange formation surface 822A at a large-curvature section is larger than the height of the boundary ridge line 823A at a small-curvature section.

In this way, a die with a simpler configuration can be used to form the intermediate wall portion 421 such that the depth of the boundary valley line 423 between the intermediate wall portion 421 and the intermediate flange 422 at a large-curvature section is larger than the depth of the boundary valley line 423 at a small-curvature section. This enables a reduction of the manufacturing cost of the press-formed product.

Also, the boundary ridge line 823A of the primary formed product forming bend die 80A may gradually slant from the large-curvature section toward the small-curvature section.

In this way, the boundary valley line 423 between the intermediate wall portion 421 and the intermediate flange 422 can be a more gently curved line. Accordingly, the compressive stress exerted on the intermediate wall portion 421 can be made smaller.

Also, in the primary formed product forming step, the primary formed product 40 may be formed by pressing the blank 30 in a state where a portion of the blank 30 excluding a portion thereof at which to form the intermediate wall portion 421 and the intermediate flange 422 to be provided to be continuous with the intermediate wall portion 421 is held with the primary formed product forming pad 70A.

In this way, the blank 30 is prevented from being displaced when the blank 30 is pressed. This makes it possible to more reliably prevent deterioration in the quality of the product (press-formed product 20).

Also, in the secondary formed product forming step, the secondary formed product 50 may be formed by pressing the primary formed product 40 in a state where a portion of the primary formed product 40 excluding the intermediate wall portion 421 and the intermediate flange 422 is held with the secondary formed product forming pad 70B.

In this way, the primary formed product 40 is prevented from being displaced when the primary formed product 40 is pressed. This makes it possible to more reliably prevent deterioration in the quality of the product (press-formed product 20).

Also, the press-formed product may have the concave-side wall part 23 provided to be continuous with the concavely curved side of the apex part 21. Moreover, the pressing step may further include a concave-side wall part forming step of forming the concave-side wall part 23 by pressing the secondary formed product 50 in a state where the convex-side wall part 52 formed in the secondary formed product forming step is held with the concave-side wall part forming pad 70C.

In this way, it is possible to work a product that cannot be held with a blank holder, such as a product whose flat portion 212 is narrow or a product which has an arc cross-sectional shape and does not include the flat portion 212. This enables improvement in the degree of freedom in design.

Also, the apex part 21 may be in an arc shape in a cross-sectional view taken along a plane crossing the longitudinal direction.

In this way, the cross-sectional area can be larger than that of the hat shape including the flat portion 212. This enables further improvement in the strength of the press-formed product 20.

Also, the press-formed product 20 may be a member to be used as a part of a skeleton component configured to support a vehicle body.

In this way, the skeleton component configured to support a vehicle body can be formed using the press-formed product 20 prevented from wrinkling.

Also, the forming die 80A according to the present embodiment is a die capable of being used in forming of the press-formed product 40 by pressing, the press-formed product 40 having the apex part 41 curved along the longitudinal direction in a plan view, the convex-side sidewall portion 421 provided to be continuous with the convexly curved side of the apex part 41, and the flange 422 provided to be continuous with the convex-side sidewall portion 421.

This forming die 80A has the sidewall portion formation surface 821A concavely curved along the longitudinal direction in the plan view and configured to form the convex-side sidewall portion 421, and the flange formation surface 822A provided to be continuous with the sidewall portion formation surface 821A and configured to form the flange 422. Moreover, the height of the boundary ridge line 823A between the sidewall portion formation surface 821A and the flange formation surface 822A at a large-curvature section is larger than the height of the boundary ridge line 823A at a small-curvature section.

In this way, the forming die 80A with a simpler configuration can be used to form the convex-side sidewall portion 421 such that the depth of the boundary valley line 423 between the convex-side sidewall portion 421 and the flange 422 at a large-curvature section is larger than the depth of the boundary valley line 423 at a small-curvature section. This enables a reduction of the manufacturing cost of the press-formed product. Also, by simplifying the configuration of the forming die 80A, the die cost can be reduced.

Further, the boundary ridge line 823A may gradually slant from the large-curvature section toward the small-curvature section.

In this way, the boundary valley line 423 between the convex-side sidewall portion 421 and the flange 422 can be a more gently curved line. Accordingly, the compressive stress exerted on the convex-side sidewall portion 421 can be made smaller.

[Other Matters]

While a preferred embodiment of this disclosure and its modifications have been described above, this disclosure is not limited to the above embodiment and its modifications and can be modified in various ways.

For example, while press-formed products having a convex-side slanted wall portion without a flange at its edge have been exemplarily described in the above embodiment and its modifications, this disclosure is not limited to these. The press-formed products can be ones having a convex-side slanted wall portion with a flange formed at its edge, for example. Such a flange portion can be formed, for example, in the secondary formed product forming step by extending a portion, on the intermediate wall portion 421 side, of the primary formed product convex-side intermediate flange 422 formed in the primary formed product forming step such that the portion of the primary formed product convex-side intermediate flange 422 on the intermediate wall portion 421 side is aligned with the intermediate wall portion 421, while leaving a flange-shaped portion at the edge side.

Also, while press-formed products with only a single curve formed along the longitudinal direction have been exemplarily described in the above embodiment and its modifications, this disclosure is not limited to these. This disclosure is also applicable to press-formed products having a plurality of curved sections along the longitudinal direction such as those with an S-shape, for example.

Also, while front pillar outer reinforcements to be used as a part of a skeleton component configured to support a vehicle body have been exemplarily described as the press-formed products in the above embodiment and its modifications, the press-formed products can also be used as other members of the skeleton component configured to support a vehicle body. Moreover, the press-formed products can be used in non-vehicle applications.

Also, while examples in which a blank is form-molded (pressed) to form a primary formed product have been described in the above embodiment and its modifications, this disclosure is not limited to these. Another working method may be used as long as a boundary valley line with a gentle V-shape can be formed. This other working method may be draw forming, for example. Using draw forming, however, involves a decrease in material efficiency, an increase in the die cost due to the addition of steps (such as a cutting step), an increase in the risk of cracking due to the decrease in sheet thickness, and so on. It is therefore preferable to employ form molding (pressing), as described in the above embodiment and its modifications.

Moreover, the specifications (shape, size, layout, etc.) of the intermediate wall portion, the intermediate flange, and other details can also be changed as appropriate.

The invention claimed is:

1. A forming die capable of being used in forming of a press-formed product by pressing, the press-formed product having an apex part curved along a longitudinal direction in a plan view, a convex-side sidewall portion provided to be continuous with a convexly curved side of the apex part, and a flange provided to be continuous with the convex-side sidewall portion, the forming die comprising:

a sidewall portion formation surface concavely curved along the longitudinal direction in the plan view and configured to form the convex-side sidewall portion; and a flange formation surface provided to be continuous with the sidewall portion formation surface and configured to form the flange, wherein a height of a boundary ridge line between the sidewall portion formation surface and the flange formation surface at a large-curvature section is larger than a height of the boundary ridge line at a small-curvature section.

2. The forming die according to claim 1, wherein the boundary ridge line gradually slants from the large-curvature section toward the small-curvature section.

* * * * *